US008810818B2

(12) United States Patent
Ueno et al.

(10) Patent No.: US 8,810,818 B2
(45) Date of Patent: Aug. 19, 2014

(54) IMAGE DATA STORAGE SYSTEM, DOCUMENT READING APPARATUS AND IMAGE FORMING APPARATUS WITH JAM DETECTOR IN AUTO DOCUMENT FEEDER

(75) Inventors: Shingo Ueno, Osaka (JP); Nobuhiro Hara, Osaka (JP); Yuuki Enokizono, Osaka (JP); Akihiro Umenaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 182 days.

(21) Appl. No.: 13/478,164

(22) Filed: May 23, 2012

(65) Prior Publication Data

US 2012/0300239 A1 Nov. 29, 2012

(30) Foreign Application Priority Data

May 27, 2011 (JP) ................................. 2011-119222

(51) Int. Cl.
*G06F 3/12* (2006.01)
*H04N 1/00* (2006.01)
(52) U.S. Cl.
CPC ........................................ *H04N 1/00* (2013.01)
USPC .......... 358/1.13; 358/1.16; 358/1.1; 358/1.15
(58) Field of Classification Search
USPC ................................. 358/1.15, 1.16, 1.1, 1.13
See application file for complete search history.

(56) References Cited

U.S. PATENT DOCUMENTS

2011/0069359 A1* 3/2011 Tojo ............................. 358/498

FOREIGN PATENT DOCUMENTS

JP 2001-274949 10/2001

* cited by examiner

*Primary Examiner* — Benny Q Tieu
*Assistant Examiner* — Martin Mushambo
(74) *Attorney, Agent, or Firm* — Gerald E Hespos; Michael J Porco; Matthew T Hespos

(57) ABSTRACT

A document reading unit performs a first reading mode for generating image data by reading a document fed by ADF and a second reading mode for generating image data by reading a document set on platen. A first reading receiver receives a first reading instruction to cause the document reading unit to continue reading a plurality of documents in the first reading mode when a jam is detected. A second reading receiver receives a second reading instruction to continue reading the plurality of documents in the second reading mode after the reading of the plurality of documents is continued in the first reading mode by the document reading unit. The document reading unit continues reading the plurality of documents in the first reading mode when the first reading instruction is received and continues reading the plurality of documents in the second reading mode when the second reading instruction is received.

5 Claims, 23 Drawing Sheets

IMAGE DATA STORAGE SYSTEM, DOCUMENT READING APPARATUS AND IMAGE FORMING APPARATUS WITH JAM DETECTOR IN AUTO DOCUMENT FEEDER

This application is based on Japanese Patent Application Serial No. 2011-119222 filed with the Japan Patent Office on May 27, 2011, the contents of which are hereby incorporated by reference.

BACKGROUND

The present disclosure relates to an image data storage system for storing image data generated by feeding a plurality of documents to a document reading apparatus by an auto document feeder and reading them by a document reading apparatus in an image data storage device and a document reading apparatus and an image forming apparatus associated with this image data storage system.

Documents can be stored as electronic data by reading the documents by a scanner which is a document reading apparatus and storing image data of the documents in a storage device. An auto document feeder (ADF) is an apparatus for automatically successively feeding a plurality of documents one by one to a document reading position of a scanner. If there are many documents to be read, the use of the auto document feeder is convenient.

However, a jam may occur (a document may be jammed) in the auto document feeder. To deal with a jam, there has been proposed an image forming apparatus configured to display the number of documents failed to be read and continue reading each failed document set on a platen in a flat-bed mode, for example, when a jam occurs in the auto document feeder during the reading of a plurality of documents and the auto document feeder cannot be used any further.

If a jam occurs in the auto document feeder, the auto document feeder cannot be used for a document seriously damaged by the jam (e.g. torn document). In this case, if it is made possible to continue reading the remaining documents in the flat-bed mode, more time and effort are required for a user if there are many remaining documents.

An object of the present disclosure is to provide an image data storage system which enables remaining documents to be read while reducing time and effort required for a user when a jam occurs in an auto document feeder and there is a document which is damaged by the jam and for which the auto document feeder cannot be used, and a document reading apparatus and an image forming apparatus associated with this image data storage system.

SUMMARY

To achieve the above object, an image data storage system according to one aspect of the present disclosure includes a document reading apparatus and an image data storage device. The document reading apparatus includes an auto document feeder unit, a platen, a document reading unit, a reading controller, a transmitter, a jam detector, a first reading receiver and a second reading receiver. The reading controller causes the document reading unit to perform a first reading mode for generating image data by reading a document fed by the auto document feeder unit and a second reading mode for generating image data by reading a document set on the platen. The transmitter transmits image data generated by the document reading unit to the image data storage device. The jam detector detects whether or not a jam has occurred in the auto document feeder unit while a plurality of documents set in the auto document feeder unit are fed to the document reading unit by the auto document feeder unit. The first reading receiver receives a first reading instruction to cause the document reading unit to continue reading the plurality of documents in the first reading mode when a jam is detected by the jam detector. The second reading receiver receives a second reading instruction to cause the document reading unit to continue reading the plurality of documents in the second reading mode after the reading of the plurality of documents is continued in the first reading mode by the document reading unit. The reading controller causes the document reading unit to continue reading the plurality of documents in the first reading mode when the first reading instruction is received by the first reading receiver and causes the document reading unit to continue reading the plurality of documents in the second reading mode when the second reading instruction is received by the second reading receiver. The image data storage device includes a receiver and an image data storage. The receiver receives image data transmitted from the transmitter. The image data storage stores a plurality of image data generated by reading the plurality of documents by the document reading unit and received by the receiver.

Further, an image forming apparatus according to another aspect of the present disclosure includes the image data storage system, an apparatus main body and a mode controller. The apparatus main body forms an image from image data and prints the formed image on a sheet. The mode controller performs a copy mode for forming an image from image data of a document read by the document reading unit and printing the formed image on a sheet by controlling the document reading unit and the apparatus main body and a scanner mode for storing image data of a plurality of documents read by the document reading unit in the image data storage device by controlling the document reading unit and the image data storage device.

A document reading apparatus according to still another aspect of the present disclosure includes an auto document feeder unit, a platen, a document reading unit, a reading controller, a transmitter, a jam detector, a first reading receiver and a second reading receiver. The reading controller causes the document reading unit to perform a first reading mode for generating image data by reading a document fed by the auto document feeder unit and a second reading mode for generating image data by reading a document set on the platen. The transmitter transmits image data generated by the document reading unit to an image data storage device. The jam detector detects whether or not a jam has occurred in the auto document feeder unit while a plurality of documents set in the auto document feeder unit are fed to the document reading unit by the auto document feeder unit. The first reading receiver receives a first reading instruction to cause the document reading unit to continue reading the plurality of documents in the first reading mode when a jam is detected by the jam detector. The second reading receiver receives a second reading instruction to cause the document reading unit to read the plurality of documents in the second reading mode after the reading of the plurality of documents is continued in the first reading mode by the document reading unit. The reading controller causes the document reading unit to continue reading the plurality of documents in the first reading mode when the first reading instruction is received by the first reading receiver and causes the document reading unit to continue reading the plurality of documents in the second reading mode when the second reading instruction is received by the second reading receiver.

These and other objects, features and advantages of the present disclosure will become more apparent upon reading the following detailed description along with the accompanying drawings.

DETAILED DESCRIPTION

Figure 1:
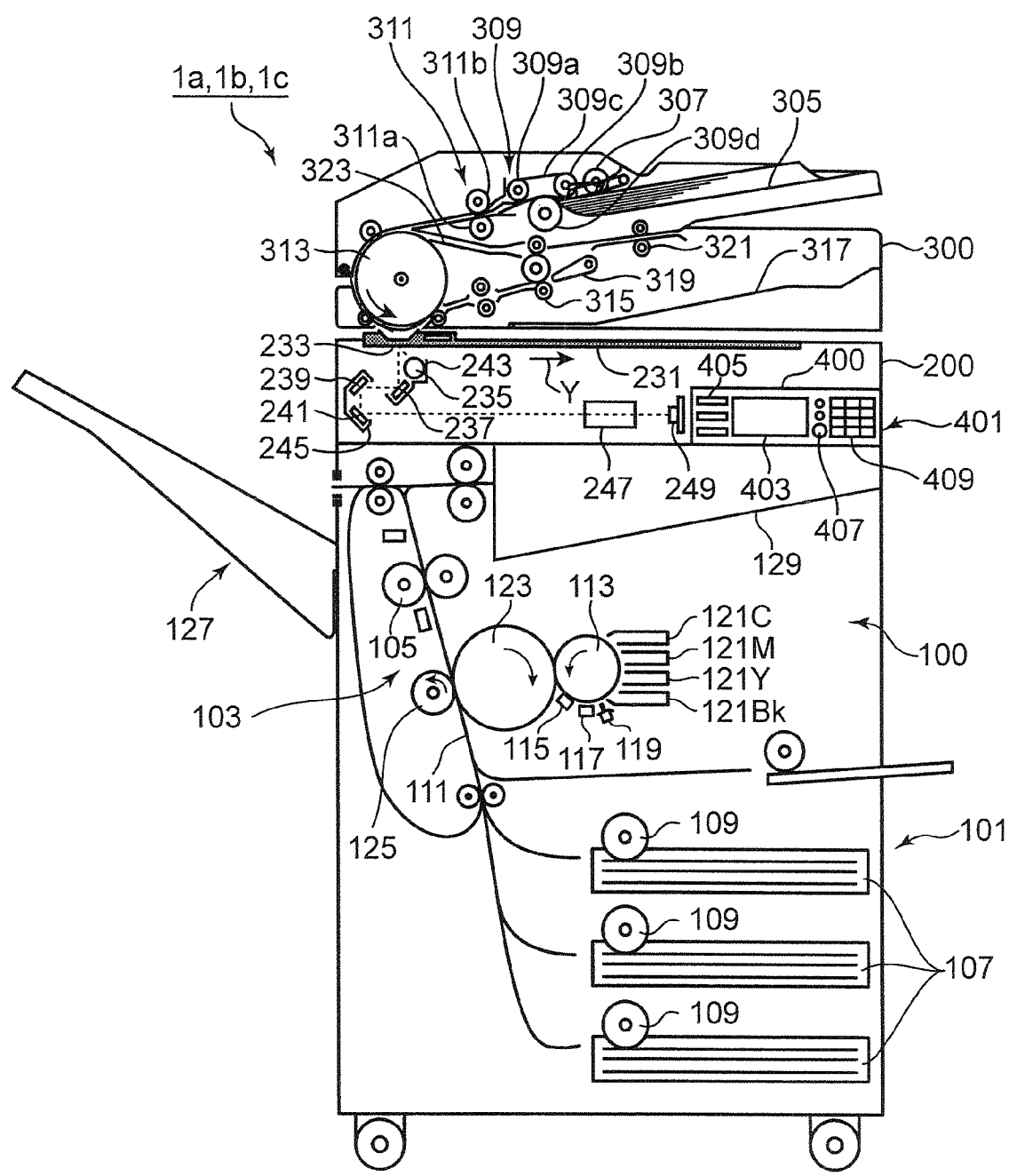
FIG. 1 is a diagram schematically showing the internal configuration of an image forming apparatus provided in image data storage systems according to first to third embodiments.

Hereinafter, first to third embodiments of the present disclosure are described in detail based on the drawings. FIG. 1 is a diagram schematically showing the internal configuration of an image forming apparatus provided in image data storage systems according to first to third embodiments. An image forming apparatus 1a provided in the image data storage system according to the first embodiment, an image forming apparatus 1b provided in the image data storage system according to the second embodiment and an image forming apparatus 1c provided in the image data storage system according to the third embodiment have a common internal configuration.

The image forming apparatuses 1a, 1b and 1c can be applied to a digital complex machine, for example, having functions of a copier, a printer, a scanner and a facsimile machine. The image forming apparatus 1a, 1b and 1c serve as a document reading apparatus in the case of the scanner function. The image forming apparatuses 1a, 1b and 1c include an apparatus main body 100, a document reading unit 200 arranged on the apparatus main body 100, a document feeding unit 300 arranged on the document reading unit 200 and an operation unit 400 arranged on the front surface of an upper part of the apparatus main body 100.

The document feeding unit 300 functions as an auto document feeder and includes a document tray 305, a pickup roller 307, a sheet separating mechanism 309, registration rollers 311, a feed drum 313, a discharge roller 315, a discharge tray 317 and the like in this order from an upstream side in a document feeding direction. A document to be read is placed on the document tray 305.

The pickup roller 307 is arranged above the document tray 305 movably upward and downward. The sheet separating mechanism 309 is provided near the pickup roller 307. The sheet separating mechanism 309 includes a drive roller 309a, a driven roller 309b, an endless belt 309c and a separation roller 309d. The drive roller 309a is located downstream of the driven roller 309b. The endless belt 309c is mounted between the drive roller 309a and the driven roller 309b, and these rollers function as feed rollers. Below the drive roller 309a and the driven roller 309b, the separation roller 309d is arranged to press the endless belt 309c.

The pickup roller 307 and the drive roller 309a rotate in a direction to feed documents placed on the document tray 305 from the document tray 305. On the contrary, the separation roller 309d rotates in a direction to return the documents placed on the document tray 305 to the document tray 305. These prevent the multiple feed of a plurality of documents picked up one by one by the pickup roller 307.

The registration rollers 311 are arranged near the sheet separating mechanism 309. The registration rollers 311 are composed of a drive roller 311a and a driven roller 311b arranged to sandwich a document. A document fed from the sheet separating mechanism 309 has the angle thereof corrected to a correct angle by the registration rollers 311 and is fed to the feed drum 313. After being caused to pass above a document reading slit 233 by the feed drum 313, the document is discharged to the discharge tray 317 by the discharge roller 315. The document reading slit 233 is provided in the document reading unit 200 to be described later.

The document feeding unit 300 further includes a document reversing mechanism with a switching guide 319, a reversing roller 321 and a reversing conveyance path 323. The document reversing mechanism is used in automatically reading both sides of a document. At the time of two-sided reading, the switching guide 319 is switched to a lower side and a document having one side read by the document reading unit 200 is conveyed to the reversing conveyance path 323 by the discharge roller 315 and the reversing roller 321. Thereafter, the switching guide 319 is switched to an upper side and the reversing roller 321 is rotated in a reverse direction, whereby the document is fed to the feed drum 313 again. Then, the other side of the document is read by the document reading unit 200 and the document is discharged to the discharge tray 317 by the discharge roller 315.

The document reading unit 200 generates image data by optically reading an image of a document. The document reading unit 200 includes a platen glass 231 (an example of a platen), a document reading slit 233, a light source 235, a first mirror 237, a second mirror 239, a third mirror 241, a first carriage 243, a second carriage 245, an imaging lens 247 and an CCD (Charge Coupled Device) 249.

The platen glass 231 and the document reading slit 233 are located on the upper surface of the document reading unit 200. The platen glass 231 is used in a flat-bed reading mode in which a document is placed on the platen glass 231 to be read. The document reading slit 233 is located below the feed drum 313. The document reading slit 233 is used in an ADF reading mode in which a document fed by the feed drum 313 is read in passing between the document reading slit 233 and the feed drum 313.

The light source 235 and the first mirror 237 are carried by the first carriage 243. The second mirror 239 and the third mirror 241 are carried by the second carriage 245. Light emitted from the light source 235 and reflected by a document is introduced to the CCD 249 by the first mirror 237, the second mirror 239, the third mirror 241 and the imaging lens 247.

In the flat-bed reading mode, a document is placed on the platen glass 231 and read by the CCD 249 while the carriages (first carriage 243 and second carriage 245) are moved in a longitudinal direction of the platen glass 231 (sub scanning direction Y). On the other hand, in the ADF reading mode, the carriages (first carriage 243 and second carriage 245) are moved to a position facing the document reading slit 233 and a document fed from the document feeding unit 300 is read by the CCD 249 through the document reading slit 233. A predetermined processing is applied to an electrical signal output from the CCD 249 as a result of this by an imaging engine (not shown) provided in the document reading unit 200 and the resultant signal is output as image data.

The apparatus main body 100 includes a sheet storage unit 101, an image forming unit 103 and a fixing unit 105. The sheet storage unit 101 is arranged in a bottommost part of the apparatus main body 100 and includes a plurality of sheet cassettes 107 capable of storing a stack of sheets. The uppermost sheet in the stack of sheets stored in the sheet cassette 107 is fed toward a sheet conveyance path 111 by driving a pickup roller 109. The sheet is conveyed to the image forming unit 103 through the sheet conveyance path 111.

The image forming unit 103 forms a toner image on a sheet conveyed thereto based on image data. The image forming unit 103 includes a photoconductive drum 113, a charge removing unit 115, a charging unit 117, an exposure unit 119, developing units 121Bk, 121Y, 121M and 121C, a transfer drum 123 and a transfer roller 125.

The charge removing unit 115 is a device for removing residual electric charges from the circumferential surface of the photoconductive drum 113. The charging unit 117 is a device for charging the circumferential surface of the photoconductive drum 113 after charge removal. The exposure unit 119 is a device for forming an electrostatic latent image on the circumferential surface of the photoconductive drum 113 by generating light modulated in correspondence with image data (image data output from the CCD 249 of the document reading unit 200, image data transmitted from a personal computer, facsimile-received image data or the like) and irradiating it to the uniformly charged circumferential surface of the photoconductive drum 113.

The developing units 121Bk, 121Y, 121M and 121C are devices for forming toner images of respective colors of black (Bk), yellow (Y), magenta (M) and cyan (C) on the circumferential surface of the photoconductive drum 113 where electrostatic latent images are formed. Unless it is necessary to distinguish the developing units of the respective colors, the respective developing units are referred to as the developing units 121. Toners corresponding to the respective colors of black, yellow, magenta and cyan are supplied from unillustrated toner supplying containers or toner cartridges.

Toner images of the respective colors formed on the photoconductive drum 113 are transferred to and superimposed on the circumferential surface of the transfer drum 123. The transfer roller 125 is a roller for transferring a toner image on the circumferential surface of the transfer drum 123 to a sheet conveyed from the sheet storage unit 101.

The sheet having the toner image transferred thereto is fed to the fixing unit 105. In the fixing unit 105, heat and pressure are applied to the toner image and the sheet, thereby fixing the toner image to the sheet. In this way, the printing of the image on the sheet is completed. The sheet is discharged to a stack tray 127 or a discharge tray 129.

The operation unit 400 includes an operation key unit 401 and a display unit 403. The display unit 403 has a touch panel function and a screen including soft keys is displayed thereon. A user operates the soft keys while seeing the screen, thereby making settings and the like necessary to perform the function such as the copy function.

The operation key unit 401 includes operation keys which are hard keys; specifically include a start key 407, a numerical keypad 409 and function switching keys 405 and the like. The start key 407 is a key for starting an operation such as a copying operation or facsimile transmission. The numerical keypad 409 includes keys used to input numbers such as the number of copies to be made, facsimile numbers and the like.

The function switching keys 405 include a copy key, a transmit key, a scanner key and the like and are used to switch a copy function, a transmit function, a scanner function and the like from one to another. If the copy key is operated, an initial screen for copy is displayed on the display unit 403. If the transmit key is operated, an initial screen for facsimile transmission and mail transmission is displayed on the display unit 403. If the scanner key is operated, an initial screen for scanner is displayed on the display unit 403.

First Embodiment

Figure 2:
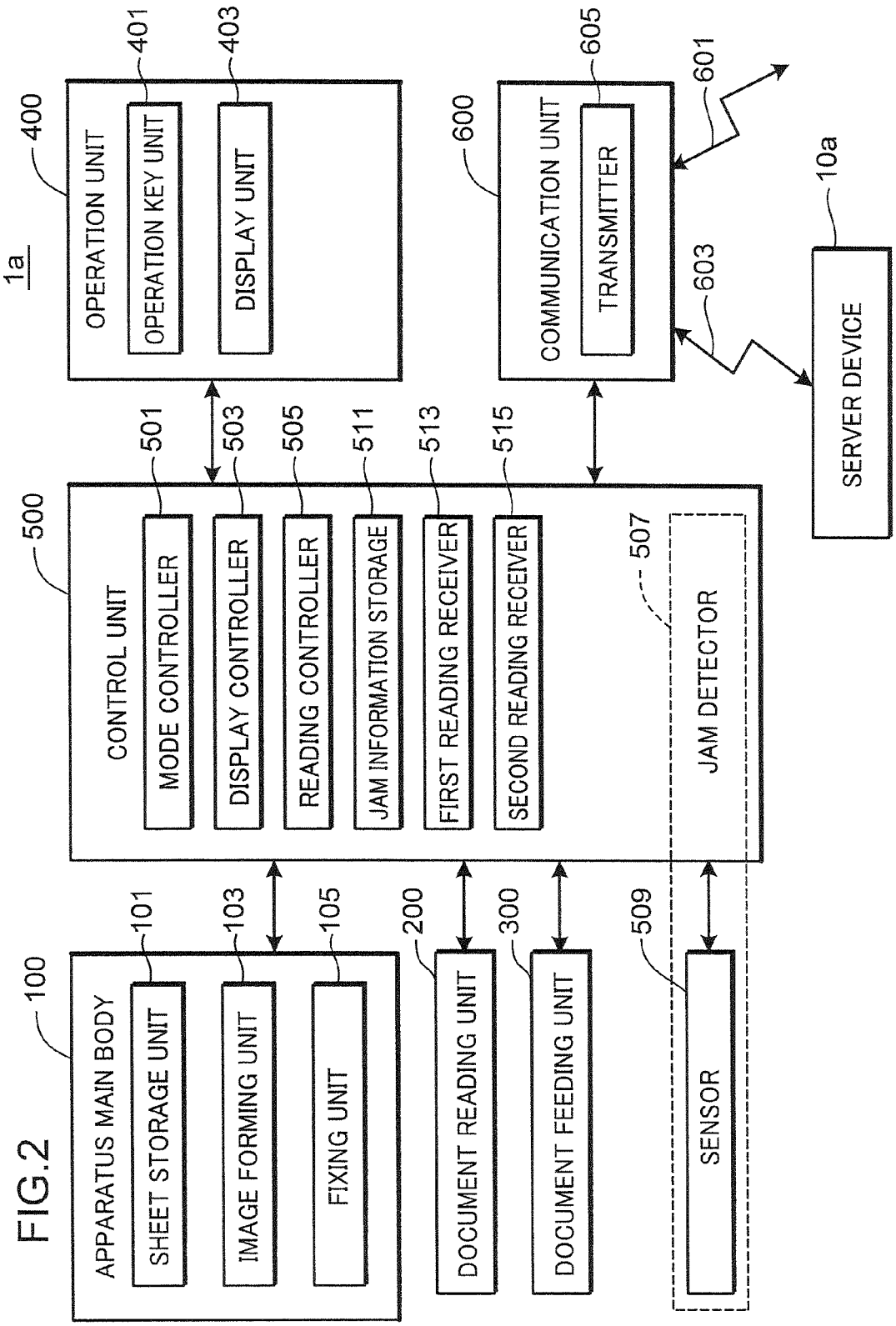
FIG. 2 is a block diagram showing the configuration of an image forming apparatus according to the first embodiment.
Figure 3:
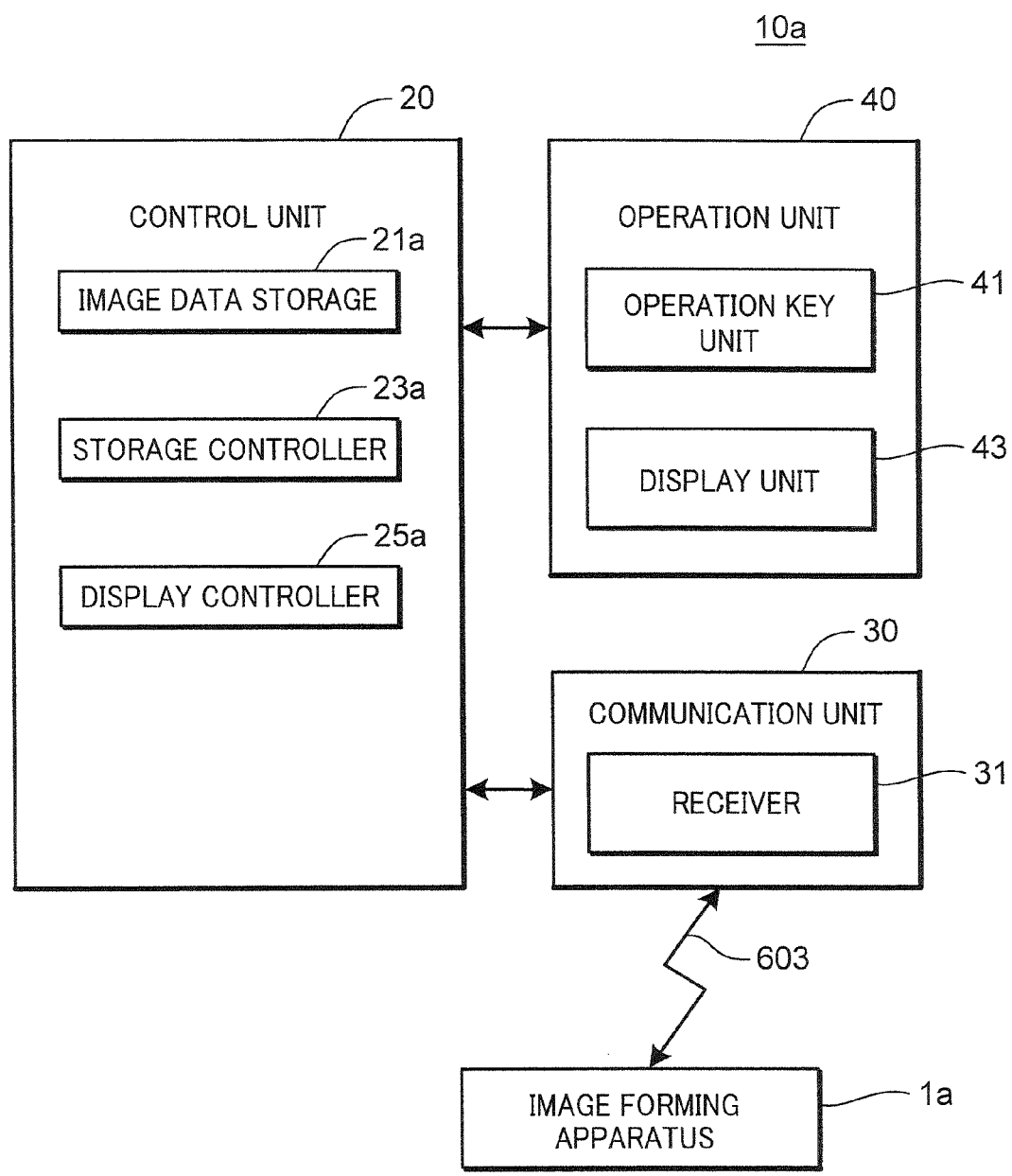
FIG. 3 is a block diagram showing the configuration of a server device according to the first embodiment.

The image data storage system according to the first embodiment includes the image forming apparatus 1a and a server device 10a (an example of an image data storage device) connected to the image forming apparatus 1a by a LAN. FIG. 2 is a block diagram showing the configuration of the image forming apparatus 1a. FIG. 3 is a block diagram showing the configuration of the server device 10a. First, the configuration of the image forming apparatus 1a shown in FIG. 2 is described.

The image forming apparatus 1a is so configured that the apparatus main body 100, the document reading unit 200, the document feeding unit 300, the operation unit 400, a control unit 500, and a communication unit 600 are connected by a bus.

The control unit 500 includes a CPU (Central Processing Unit), a ROM (Read Only Memory), a RAM (Random Access Memory) and the like. The CPU performs a control necessary to operate the image forming apparatus 1a on the above elements of the image forming apparatus 1a such as the apparatus main body 100. The ROM stores software necessary to operate the image forming apparatus 1a. The RAM is used to temporarily store data generated at the time of software implementation and to store application software and the like.

The control unit 500 has functions of a mode controller 501, a display controller 503, a reading controller 505, a jam detector 507, a jam information storage 511, a first reading receiver 513 and a second reading receiver 515. These functions are realized by the above CPU, ROM, RAM and the like provided in the control unit 500.

The mode controller 501 performs a copy mode and a scanner mode. In the copy mode, the mode controller 501 controls the document reading unit 200 and the apparatus main body 100 (further controls the document feeding unit 300 in the case of using the document feeding unit 300) to form an image from image data of a document read by the document reading unit 200 and print the formed image on a sheet. In the scanner mode, the mode controller 501 controls the document reading unit 200 (further controls the document feeding unit 300 in the case of using the document feeding unit 300) to transmit image data of a document read by the document reading unit 200 to the server device 10a and store it in the server device 10a.

The display controller 503 causes the display unit 403 to display operation screens (e.g. a setting screen necessary to perform the copy function) used for various operations in the image forming apparatus 1a.

The reading controller 505 causes the document reading unit 200 to perform a first reading mode and a second reading mode. The first reading mode is a mode for generating image data by reading a document fed by the document feeding unit 300. The second reading mode is a mode for generating image data by reading a document set on the platen glass 231.

The jam detector 507 detects whether or not a jam has occurred in the document feeding unit 300 while a plurality of documents set on the document tray 305 of the document feeding unit 300 are successively fed to the document reading unit 200 by the document feeding unit 300.

The jam detector 507 includes a plurality of sensors 509. These sensors 509 are disposed at intervals along a document conveyance path in the document feeding unit 300. The jam detector 507 measures a time during which a document is detected for each of the sensors 509 and judges the occurrence of a jam at an arrangement position of the sensor 509 if there is any sensor 509 that continues detecting the document for a predetermined time.

Various sensors capable of detecting a document can be used as the sensors 509. For example, arm type sensors which detect a document by being directly brought into contact with the document, reflection type sensors which detect a document by emitting light to the document from a light emitter and receiving reflected light from the surface of the document by a light receiver and other sensors can be used as such.

In the case of detecting a jam, the jam detector 507 stores jam information in the jam information storage 511. The jam information is information which can specify jams in the chronological order when the jams occur in reading a plurality of documents. For example, the jam information of the first jam is "J1", that of the second jam is "J2" and that of the third jam is "J3".

Accordingly, in reading a plurality of documents, the jam information "J1" is stored in the jam information storage 511 if one jam has occurred, the jam information "J1", "J2" is stored in the jam information storage 511 if two jams have occurred and the jam information "J1", "J2" and "J3" is stored in the jam information storage 511 if three jams have occurred.

The first reading receiver 513 receives a first reading instruction to continue reading a plurality of documents in the first reading mode by the document reading unit 200 when a jam is detected by the jam detector 507.

The second reading receiver 515 receives a second reading instruction to continue reading a plurality of document in the second reading mode by the document reading unit 200 after the reading of the plurality of documents is continued in the first reading mode by the document reading unit 200. Further, the second reading receiver 515 receives the entry of the number of documents to be read in the second reading mode.

The reading controller 505 causes the document reading unit 200 to continue reading the plurality of documents in the first reading mode when the first reading instruction is received by the first reading receiver 513 while causing the document reading unit 200 to continue reading the plurality of documents in the second reading mode when the second reading instruction is received by the second reading receiver 515. Further, the reading controller 505 causes the document reading unit 200 to continue reading the entered number of documents in the second reading mode when the second reading instruction is received by the second reading receiver 515.

The communication unit 600 is composed of a facsimile communication part using a telephone line 601 and a network communication part using a LAN 603. The communication unit 600 includes a transmitter 605. The transmitter 605 transmits image data generated by the document reading unit 200 to the server device 10a. The function of the transmitter 605 is mainly realized by the network communication part (network I/F unit).

The apparatus main body 100, the document reading unit 200, the document feeding unit 300 and the operation unit 400 are not described since they are already described.

Next, the configuration of the server device 10a shown in FIG. 3 is described. The server device 10a is so configured that a control unit 20, a communication unit 30 and an operation unit 40 are connected to each other by a bus. The server device 10a is a server for storing image data. That is, the server device 10a has a function of storing image data transmitted from a client device (e.g. image forming apparatus 1a) via the LAN 603 and transmitting image data to the client device if the client device accesses to read the image data via the LAN 603.

The communication unit 30 is an interface for network communication using the LAN 603. The communication unit 30 has the function of a receiver 31. The receiver 31 receives image data transmitted from the transmitter 605 (FIG. 2).

The operation unit 40 includes an operation key unit 41 and a display unit 43. The display unit 43 has a touch panel function and a screen including soft keys is displayed thereon. A user operates the soft keys and the operation key unit 41 while seeing the screen, thereby entering a command for the editing, deletion and the like of image data stored in an image data storage 21a to be described later.

The control unit 20 has the functions of the image data storage 21a, a storage controller 23a and a display controller 25a. These functions are realized by a CPU, a ROM, a RAM and the like provided in the control unit 20.

The image data storage 21a stores a plurality of image data received by the receiver 31. The plurality of image data are generated by reading a plurality of documents by the document reading unit 200.

The storage controller 23a controls to write image data in the image data storage 21a, read image data stored in the image data storage 21a and delete image data stored in the image data storage 21a.

The display controller 25a causes the display unit 43 to display operation screens (e.g. a setting screen necessary to delete and edit image data) used for various operations in the server device 10a.

Figure 4:
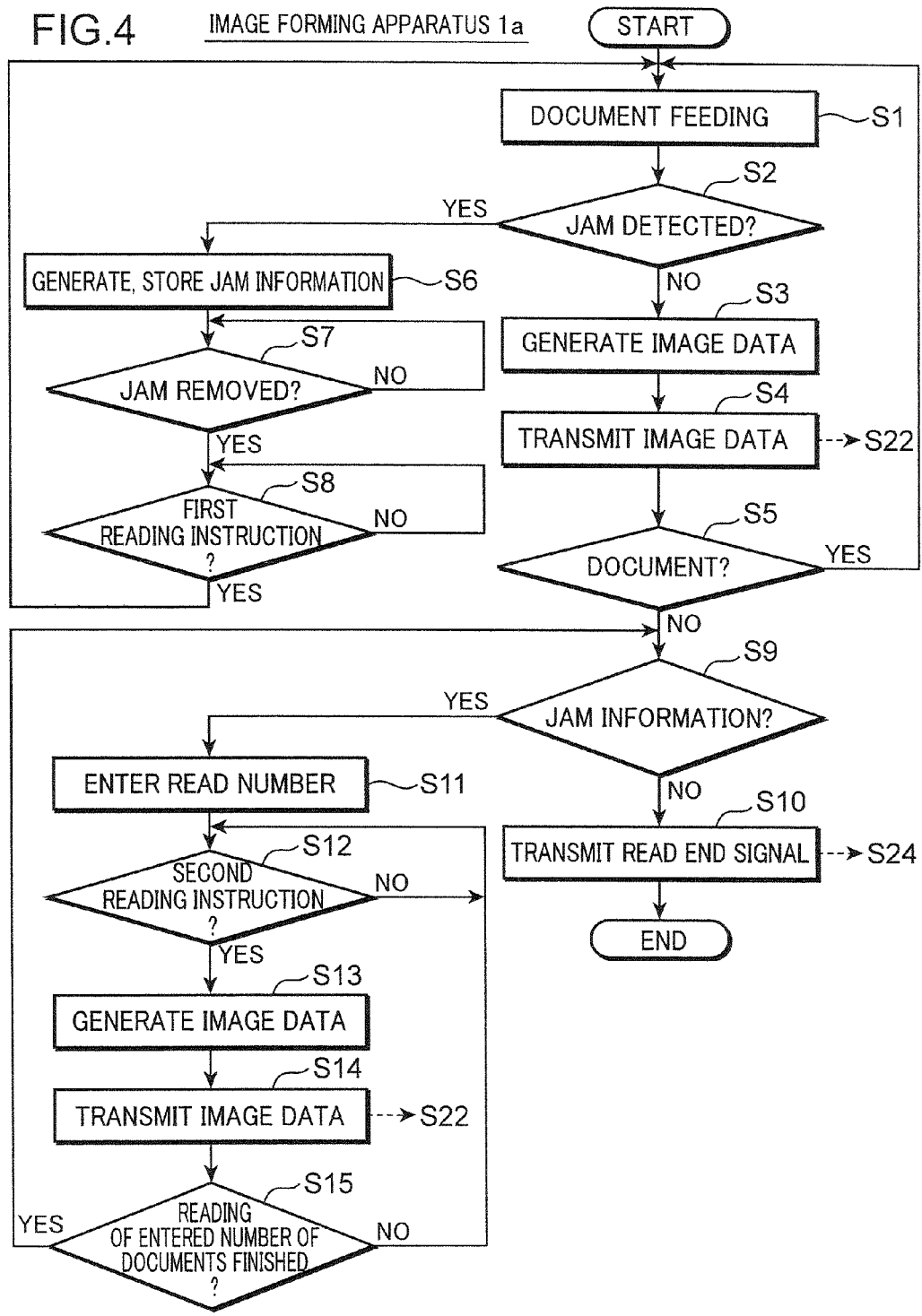
FIG. 4 is a first half of a flow chart showing the operation of the image data storage system according to the first embodiment.
Figure 5:
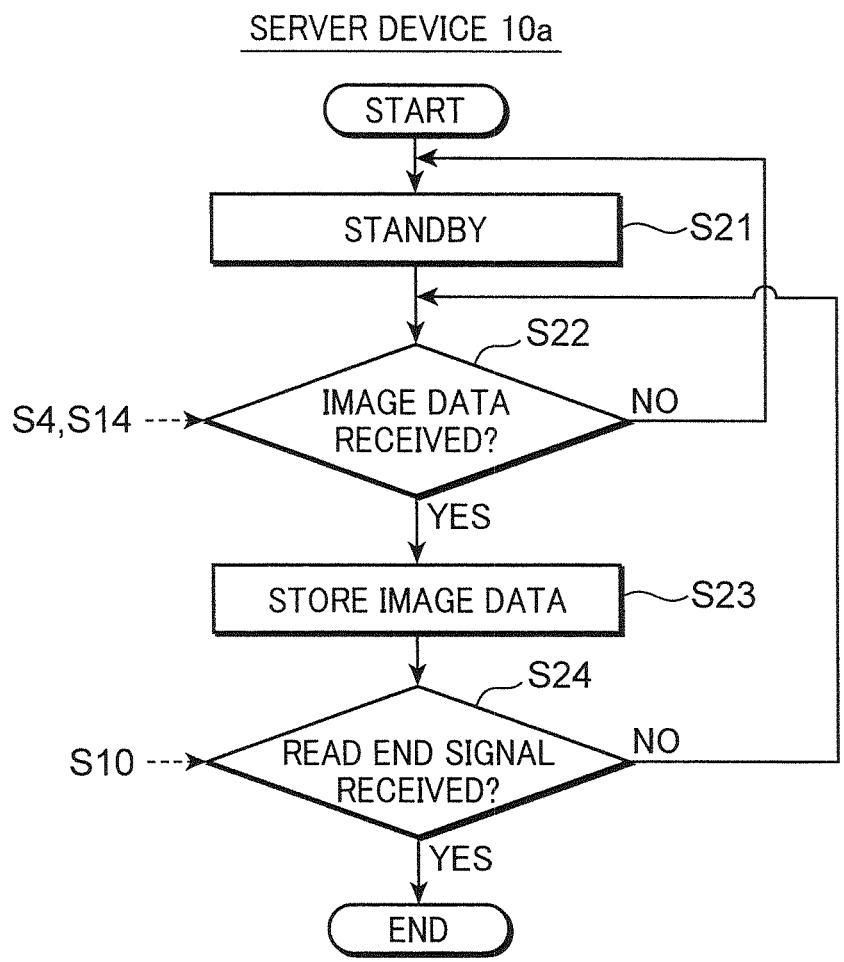
FIG. 5 is a second half of the flow chart.

Next, the operation of the image data storage system according to the first embodiment is described. FIGS. 4 and 5 are a flow chart showing this operation. A case where image data of eight pages are generated by reading one side of each of eight documents is described as an example.

A user selects the scanner function by operating the function switching key 405 of the operation unit 400 shown in FIG. 1. The scanner function is a function in which image data of a document read by the document reading unit 200 is transmitted to the server device 10a via the LAN 603 and stored in the server device 10a.

The user sets eight documents on the document tray 305 shown in FIG. 1 and operates the start key 407. In this way, the uppermost one of the eight documents set on the document tray 305 is fed to the document reading unit 200 (Step S1). That is, the pickup roller 307 picks up the uppermost one of the eight documents set on the document tray 305 and feeds it into the document feeding unit 300.

The jam detector 507 detects whether or not a jam has occurred for the document being fed in the document feeding unit 300 (Step S2). If the jam detector 507 detects no jam (NO in Step S2), the document is fed to the document reading slit 233 and the document reading unit 200 reads the document and generates image data added with page information (Step S3). The page information indicates a page assigned to that image data. That is, the page information is information indicating an image on which page is an image generated from that image data. For example, the page information "1" is added to the image data of the document read first. An image generated from this image data becomes an image of the first page. In other words, the page information is information on the pages assigned to the plurality of documents in a reading order through the first reading mode and the second reading mode.

The transmitter 605 transmits the image data generated in Step S3 to the server device 10a (Step S4). A return is made to Step S1 if the reading controller 505 judges that the documents are set on the document tray 305 (YES in Step S5).

On the other hand, in the case of detecting the occurrence of a jam for the document being fed in the document feeding unit 300 (YES in Step S2), the jam detector 507 generates jam information and stores it in the jam information storage 511 (Step S6). Here, information indicating the occurrence of the first jam (e.g. "J1") is the jam information.

The jam detector 507 judges whether or not the jam has been removed (Step S7). Unless the user removes the document jammed in the document feeding unit 300, the jam detector 507 does not judge that the jam has been removed (NO in Step S7). In this case, a processing of Step S7 is repeated.

When the user removes the document jammed in the document feeding unit 300, the jam detector 507 judges that the jam has been removed (YES in Step S7) and the display controller 503 causes the display unit 403 to display a message "Operate start key to continue document reading by ADF". Document reading by the ADF means the reading of documents in the first reading mode.

The first reading receiver 513 judges whether or not the user has operated the start key 407, in other words, a first reading instruction has been received (Step S8).

Unless the first reading receiver 513 judges that the first reading instruction has been received (NO in Step S8), a process of Step S8 is repeated.

A return is made to Step S1 when the first reading receiver 513 judges that the first reading instruction has been received (YES in Step S8). In this way, the reading is continued in the first reading mode for the documents succeeding the jammed document.

Unless judging that the documents are set on the document tray 305 (NO in Step S5), the reading controller 505 judges whether or not the jam information is stored in the jam information storage 511 (Step S9).

If the reading controller 505 does not judge that the jam information is stored in the jam information storage 511 (NO in Step S9), i.e. if no jam has occurred in reading the eight documents, the communication unit 600 transmits an end signal (e.g. All Get Compete signal) indicating the end of the process of reading all the documents to the server device 10a using the LAN 603 (Step S10).

Step S11 follows if the reading controller 505 judges that the jam information is stored in the jam information storage 511 (YES in Step S9). It is assumed that two jams have occurred, the third document was involved in the first jam and the fifth and sixth documents were involved in the second jam. The jam information "J1" indicating the occurrence of the first jam and the jam information "J2" indicating the occurrence of the second jam are stored in the jam information storage 511. It is assumed that the third, fifth and sixth documents are seriously damaged by the jams and cannot be read in the first reading mode.

The display controller 503 causes the display unit 403 to display a message "Enter the number of documents that could not be read due to the occurrence of the first jam, successively sets the documents on the platen and repeatedly operate the start key". This means that the reading is continued in the second reading mode. The number of documents is entered since the jam detector 507 cannot detect the number of the documents jammed in the first jam. Since the document that could not be read due to the first jam is the third document, i.e. a single document, the number of the document "1" is entered by operating the numerical keypad 409 (Step S11). The user sets the third document on the platen glass 231.

The second reading receiver 515 judges whether or not the user has operated the start key 407, in other words, a second reading instruction has been received (Step S12).

A processing of Step S12 is repeated unless the second reading receiver 515 judges that the second receiving instruction has been received (NO in Step S12).

If the second reading receiver 515 judges that the second reading instruction has been received (YES in Step S12), the document reading unit 200 reads the document set on the platen glass 231 and generates image data added with the page information (Step S13). The transmitter 605 transmits the image data generated in Step S13 to the server device 10a (Step S14).

The reading controller 505 judges whether or not the reading of the number of the document entered in Step S11 has been completed (Step S15). Here, since the entered number is "1", the reading controller 505 judges that the reading of the entered number of the document has been completed (YES in Step S15), the jam information "J1" is deleted from the jam information storage 511 and Step S9 follows.

Since the second jam information "J2" is stored in the jam information storage 511, the reading controller 505 judges that the jam information is stored in the jam information storage 511 (YES in Step S9).

The display controller 503 causes the display unit 403 to display a message "Enter the number of documents that could not be read due to the occurrence of the second jam, successively sets the documents on the platen and repeatedly operate the start key". Since two documents (fifth and sixth documents) could not be read due to the occurrence of the second jam, the user enters the number of the documents "2" by operating the numerical keypad 409 (Step S11).

The user sets the fifth document on the platen glass 231 and operates the start key 407. The second reading receiver 515 judges whether or not the user has operated the start key 407, in other words, a second reading instruction has been received (Step S12).

When the second reading receiver 515 receives the second reading instruction (YES in Step S12), the document reading unit 200 reads the document set on the platen glass 231 and generates image data added with the page information (Step S13).

The transmitter 605 transmits the image data generated in Step S13 to the server device 10a (Step S14) and the reading controller 505 judges whether or not the reading of the number of the documents entered in Step S11 has been completed (Step S15). Here, since the entered number is "2", the reading controller 505 judges that the reading of the entered number of the documents has not been completed yet (NO in Step S15) and a return is made to Step S12. Then, the user sets the next document (here, sixth document) on the platen glass 231 and operates the start key 407.

The next document set on the platen glass 231 is read by the document reading unit 200 and image data added with the page information is generated (Step S13). The transmitter 605 transmits the image data generated in Step S13 to the server device 10a (Step S14). The reading controller 505 judges whether or not the reading of the number of the documents entered in Step S11 has been completed (Step S15). Since the entered number is "2", the reading controller 505 judges that the reading of the entered number of the documents has been completed (YES in Step S15), the jam information "J2" is deleted from the jam information storage 511 and a return is made to Step S9.

Since no jam information is stored in the jam information storage 511, the reading controller 505 judges that no jam information is stored in the jam information storage 511 (NO in Step S9) and Step S10 follows.

In Steps S4 and S14, the image data transmitted to the server device 10a are stored in the image data storage 21a (FIG. 3) in the order of reception. This is described.

The server device 10a is in a standby state (Step S21). The storage controller 23a judges whether or not image data transmitted from the transmitter 605 of the image forming apparatus 1a has been received by the receiver 31 (Step S22).

If the storage controller 23a does not judge that the image data transmitted from the transmitter 605 of the image forming apparatus 1a has been received by the receiver 31 (NO in Step S22), a return is made to Step S21. If the storage controller 23a judges that the image data transmitted from the transmitter 605 of the image forming apparatus 1a has been received by the receiver 31 (YES in Step S22), the storage controller 23a stores the image data received by the receiver 31 in the image data storage 21a (Step S23).

The storage controller 23a judges whether or not an end signal indicating the end of the process of reading all the documents has been received by the receiver 31 (Step S24). If the storage controller 23a does not judge that the receiver 31 has received that end signal (NO in Step S24), a return in made to Step S22. If the storage controller 23a judges that the receiver 31 has received that end signal (YES in Step S24), the process of storing the image data of the eight pages generated by reading the eight documents in the image data storage 21a is finished.

Figure 6:
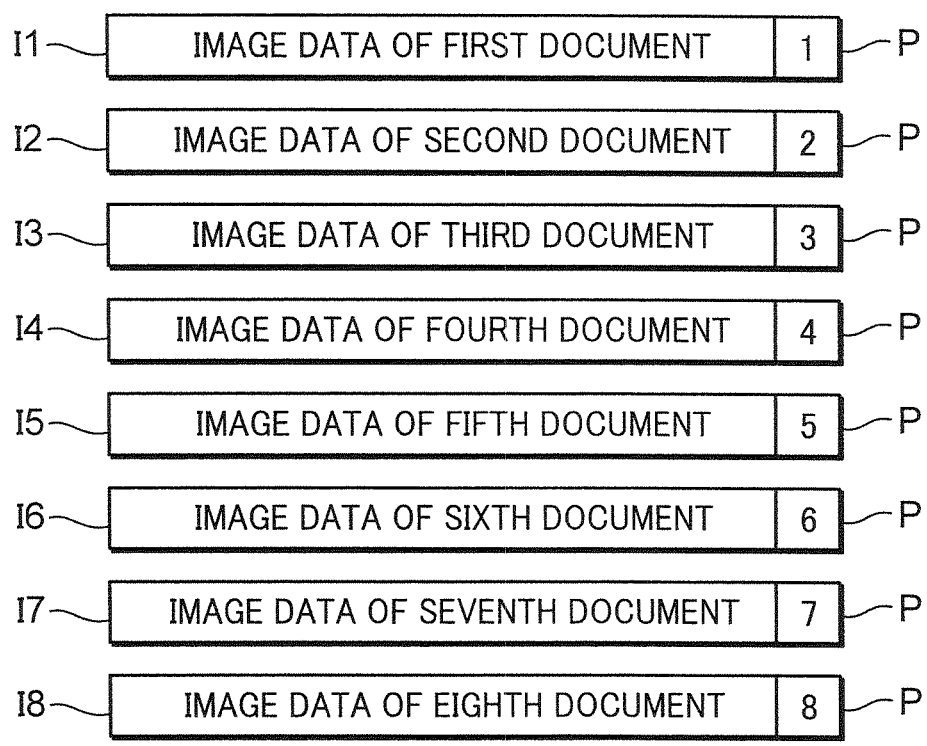
FIG. 6 is a diagram showing an example of image data of eight pages stored in an image data storage when no jam has occurred in a document feeding unit.

FIG. 6 is a diagram showing an example of image data I1 to I8 of eight pages stored in the image data storage 21a when no jam has occurred in the document feeding unit 300. Page information P is added to each of the image data I1 to I8.

Since no jam has occurred, the order of the eight documents and the order of images of the eight pages coincide. That is, the image data of the first page is the image data I1 of the first document, the image data of the second page is the image data I2 of the second document, the image data of the third page is the image data I3 of the third document, the image data of the fourth page is the image data I4 of the fourth document, the image data of the fifth page is the image data I5 of the fifth document, the image data of the sixth page is the image data I6 of the sixth document, the image data of the seventh page is the image data I7 of the seventh document and the image data of the eighth page is the image data I8 of the eighth document.

Figure 7:
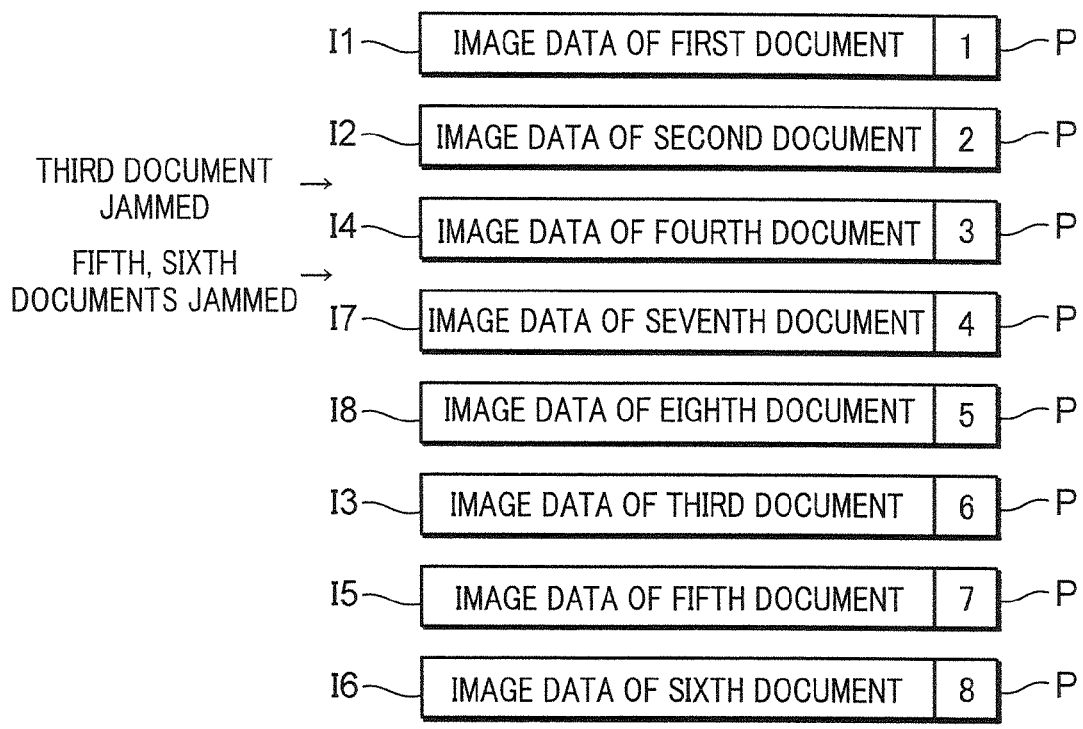
FIG. 7 is a diagram showing an example of image data of eight pages stored in the image data storage when a jam has occurred in the document feeding unit.

FIG. 7 is a diagram showing an example of image data I1 to I8 of eight pages stored in the image data storage 21a when two jams have occurred in the document feeding unit 300. The image data of the first page is the image data I1 of the first document, the image data of the second page is the image data I2 of the second document, the image data of the third page is the image data I4 of the fourth document, the image data of the fourth page is the image data I7 of the seventh document, the image data of the fifth page is the image data I8 of the eighth document, the image data of the sixth page is the image data I3 of the third document, the image data of the seventh page is the image data I5 of the fifth document and the image data of the eighth page is the image data I6 of the sixth document.

Main effects of the first embodiment are described. In the image data storage system according to the first embodiment, if a jam is detected during the reading of a plurality of documents in the first reading mode (YES in Step S2), a first reading instruction to continue reading the plurality of documents in the first reading mode is received by the first reading receiver 513 (Step S8). After the first reading instruction is received and the reading of the plurality of documents is continued in the first reading mode, the second reading receiver 515 receives a second reading instruction to continue reading the plurality of documents in the second reading mode (Step S12).

Thus, according to the image data storage system according to the first embodiment, it is possible to continue the reading of the remaining documents after a jammed document in the first reading mode and finally read the jammed document in the second reading mode when a jam occurs in the document feeding unit 300 during the reading of a plurality of documents in the first reading mode. Therefore, when a jam occurs in the document feeding unit 300 and there are documents which are damaged and for which the document feeding unit 300 cannot be used, it is possible to first read the documents that can be read in the first reading mode and finally all the damaged documents, for which the document feeding unit 300 cannot be used, in the second reading mode.

As described above, according to the first embodiment, it is possible to read the remaining documents while reducing time and effort of the user when a jam occurs in the document feeding unit 300 and there are documents which are damaged thereby and for which the document feeding unit 300 cannot be used.

Further, the image data storage system according to the first embodiment has the following effect. If two or more documents are jammed by one jam due to the multiple feed of the documents, the jam detector 507 can only detect the jam and the number of the jammed documents cannot be detected. It is necessary to have the reading controller 505 recognize whether to control the document reading unit 200 to read the documents only once in the second reading mode or to control the document reading unit 200 to read the documents twice or more.

According to the first embodiment, the number of the documents to be read in the second reading mode is entered (Step S11). Thus, it is possible to have the reading controller 505 recognize the number of the documents to be read in the second reading mode by the document reading unit 200. Therefore, even if two or more documents are jammed in one jam, these documents can be read in the second reading mode.

Further, the image data storage system according to the first embodiment has the following effect. If the jam detector 507 detects the occurrence of a plurality of jams, the first reading receiver 513 receives a first reading instruction at every occurrence of the jam. The reading controller 505 can cause the document reading unit 200 to continue reading the plurality of documents in the second reading mode when a second reading instruction is received by the second reading receiver 515 after the last first reading instruction is received by the first reading receiver 513 and the reading of the plurality of documents is continued in the first reading mode by the document reading unit 200.

This is specifically described. This means the following document reading as described with reference to FIG. 7. The reading of the fourth and subsequent documents can be continued in the first reading mode if the third document is jammed in reading eight documents using the document feeding unit 300, and the reading of the seventh and subsequent documents can be continued in the first reading mode if the fifth and sixth documents are jammed due to the multiple feed. After the eighth document is read in the first reading mode, the reading of the third document and the reading of the fifth and the sixth documents can be continued in the second reading mode. Thus, when a plurality of jams occur in the document feeding unit 300 and there are documents which are damaged thereby and for which the document feeding unit 300 cannot be used, it is possible to read the remaining documents while reducing time and effort of the user.

The image data storage system has been described in the first embodiment. An embodiment in which the server device 10*a* is incorporated into the image forming apparatus 1*a* also has the above main effects of the first embodiment. In this embodiment, in the scanner mode, the mode controller 501 shown in FIG. 2 controls the document reading unit 200, the document feeding unit 300 and the server device 10*a* and stores image data of a plurality of documents read by the document reading unit 200 in the server device 10*a*.

Second Embodiment

An image data storage system according to a second embodiment is described mainly on points of difference from the image data storage system according to the first embodiment, but not on the same points. As shown in FIG. 7, if a jam occurs in the first embodiment, the order of the page assigned to the image data of the jammed document is later than those of the pages assigned to image data of the documents that are not jammed in a plurality of image data stored in the image data storage 21*a*. Accordingly, the order of the images of the first to eighth pages is different from the order of the eight documents. In the second embodiment, the orders of the pages respectively assigned to a plurality of image data can be manually edited so that the order of images of a plurality of pages becomes the same as that of a plurality of documents.

Figure 8:
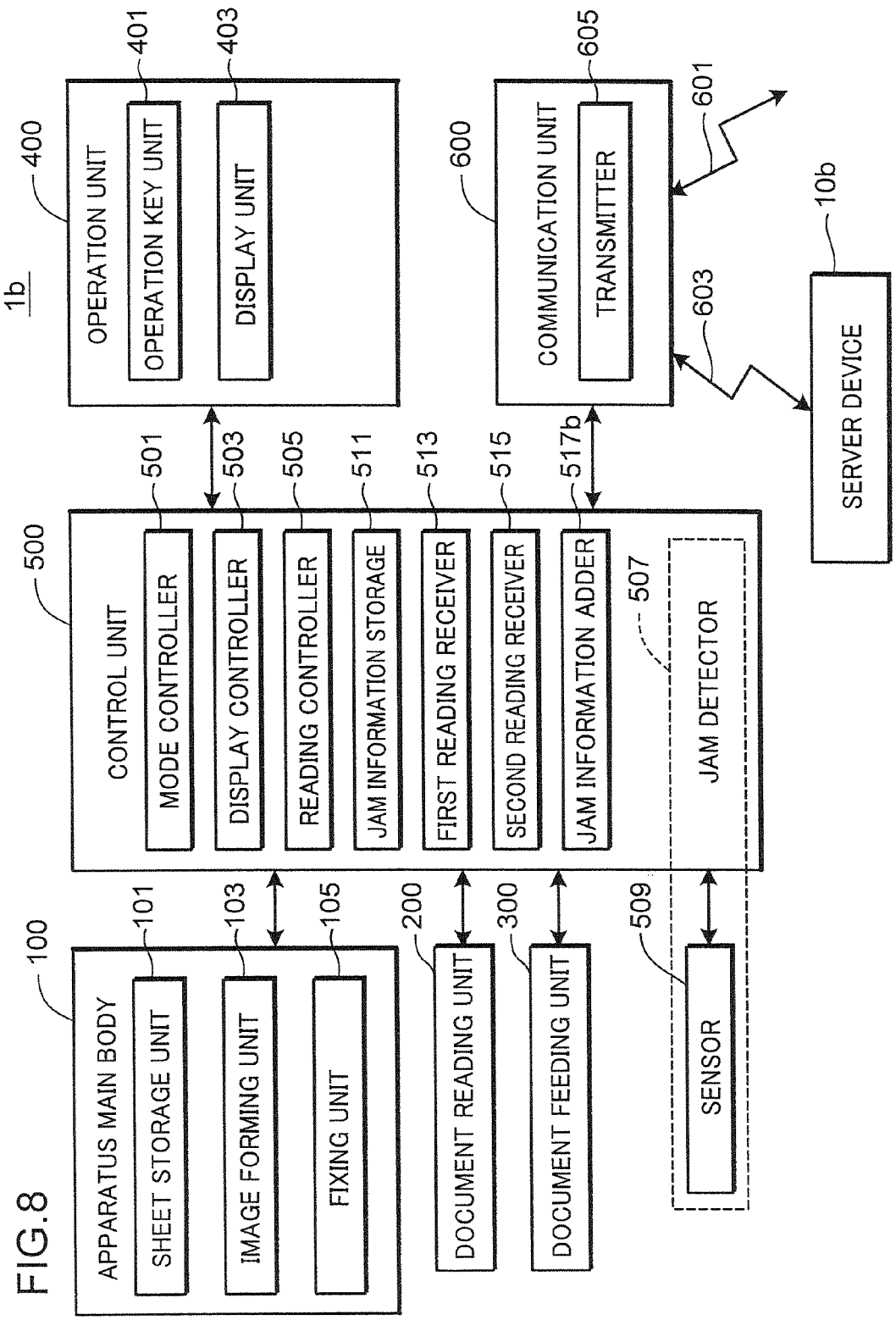
FIG. 8 is a block diagram showing the configuration of an image forming apparatus according to the second embodiment.
Figure 9:
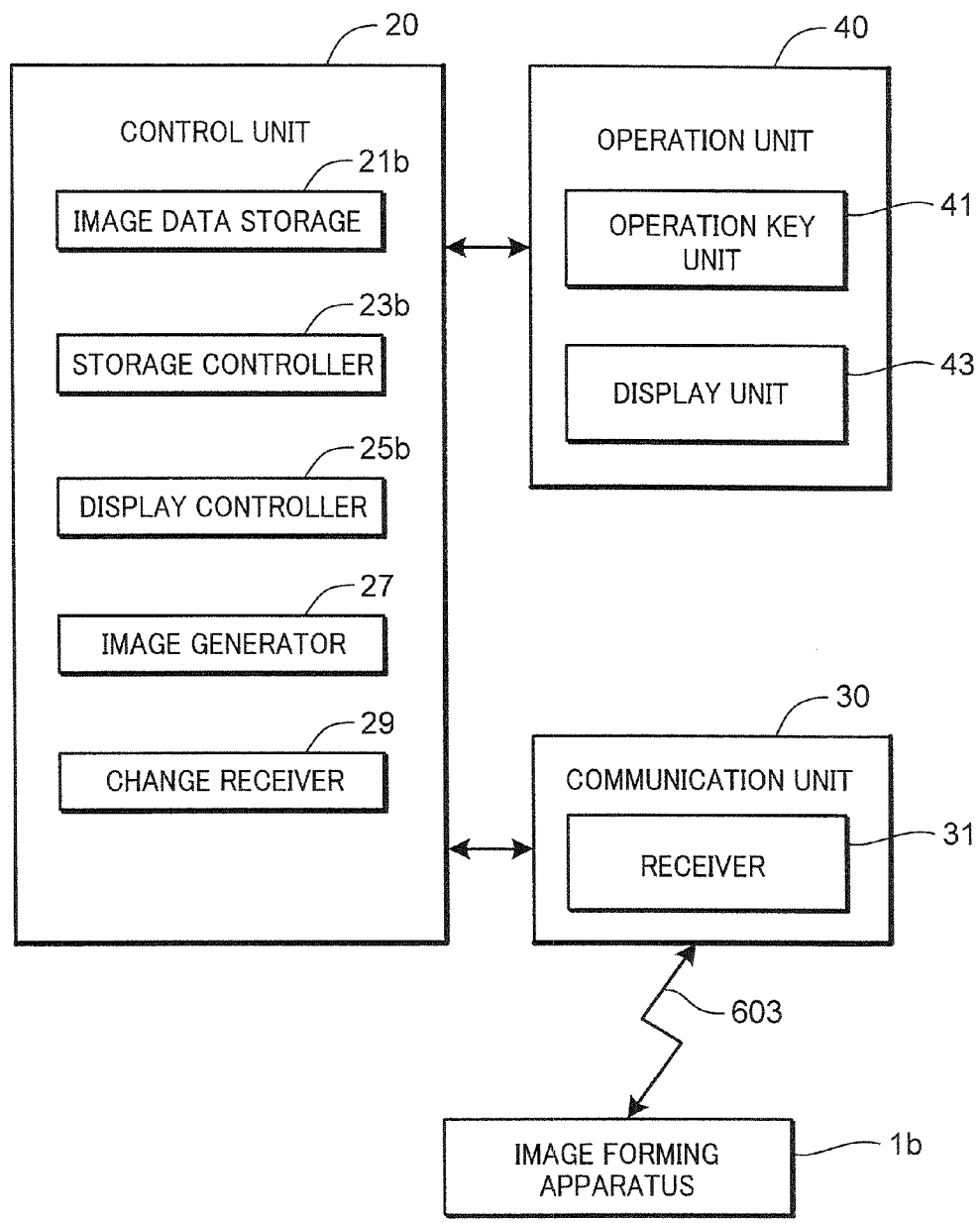
FIG. 9 is a block diagram showing the configuration of a server device according to the second embodiment.

The image data storage system according to the second embodiment includes the image forming apparatus 1*b* and a server device 10*b* (an example of the image data storage device) connected to the image forming apparatus 1*b* by a LAN. FIG. 8 is a block diagram showing the configuration of the image forming apparatus 1*b*. FIG. 9 is a block diagram showing the configuration of the server device 10*b*. First, the configuration of the image forming apparatus 1*b* shown in FIG. 8 is described.

The image forming apparatus 1*b* has the configuration of the image forming apparatus 1*a* shown in FIG. 2 added with a jam information adder 517*b*. A control unit 500 has the function of the jam information adder 517*b*. The jam information adder 517*b* adds jam information to image data of a document read by a document reading unit 200 when a second reading instruction is received by a second reading receiver 515. A transmitter 605 transmits the image data added with the jam information to the server device 10*b*.

A control unit 20 of the server device 10*b* has the functions of an image data storage 21*b*, a storage controller 23*b*, a display controller 25*b*, an image generator 27 and a change receiver 29 as shown in FIG. 9. These functions are realized by a CPU, a ROM, a RAM and the like provided in the control unit 20.

The function of the image data storage 21*b* is similar to that of the image data storage 21*a*.

In addition to the function of the display controller 25*a*, the display controller 25*b* has a function of causing a display unit 43 to display a preview image (an example of an image specifying image data added with jam information) of an image generated from image data added with jam information. The preview image of the image generated from the image data added with the jam information is generated by the image generator 27.

Note that the image specifying the image data added with the jam information is not limited to the above preview image and, for example, may be a character image. For example, if two jams occur, the display controller 25*b* causes the display unit 43 to display a "message indicating the occurrence of the first jam" and a "message indicating the occurrence of the second jam". Since a user recognizes the document jammed in the first jam and the document jammed in the second jam, he can operate to change the order of pages assigned to image data added with jam information only by seeing these character images.

The change receiver 29 receives an operation of changing the order of the page assigned to the image data added with the jam information in a state where preview images are displayed on the display unit 43.

In addition to the function of the storage controller 23*a*, the storage controller 23*b* has a function of editing the order of pages respectively assigned to a plurality of image data including the image data added with the jam information so as to achieve the order received by the change receiver 29 and storing the image data in the edited order in the image data storage 21*b*.

The display controller 25*b*, the change receiver 29 and the storage controller 23*b* can be defined as follows.

The display controller 25*b* causes the display unit 43 to display (a) images specifying image data of documents read in the first reading mode by the document reading unit 200 before a jam detector 507 detects the occurrence of the first jam and images specifying image data of documents read by the document reading unit 200 when a first reading instruction is received by a first reading receiver 513, and (b) images specifying image data of documents read by the document reading unit 200 when a second reading instruction is received by the second reading receiver 515.

The change receiver 29 receives an operation of changing the orders of the pages assigned to the image data of the documents specified by the images of (b) in a state where the images of (a) and those of (b) are displayed on the display unit 43.

The storage controller 23b edits the order of the pages respectively assigned to the image data of the documents specified by the images of (a) and those of (b) so as to achieve the order received by the change receiver 29 and stores the image data in the edited order in the image data storage 21b.

Figure 10:
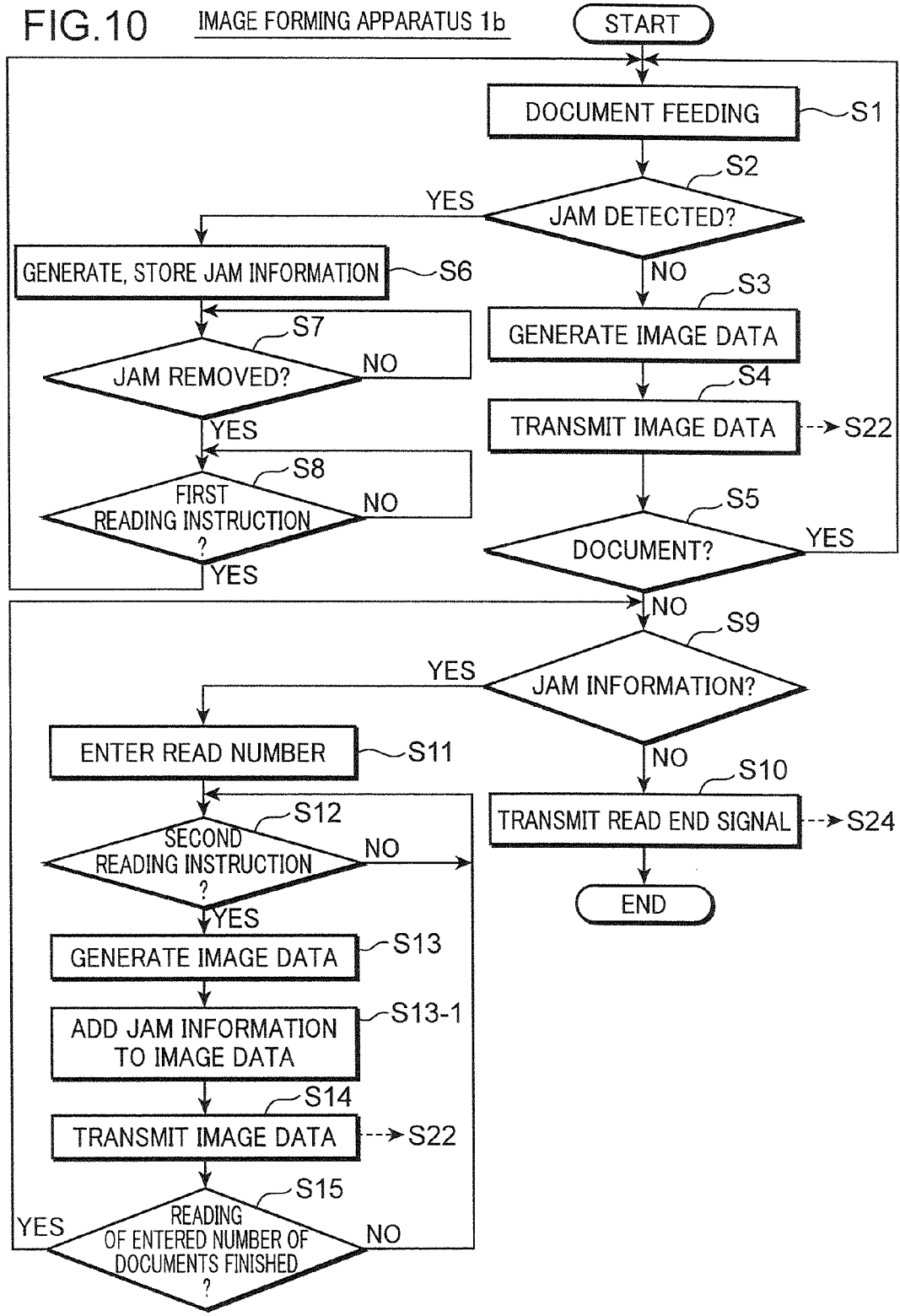
FIG. 10 is a first half of a flow chart showing the operation of an image data storage system according to the second embodiment.
Figure 11:
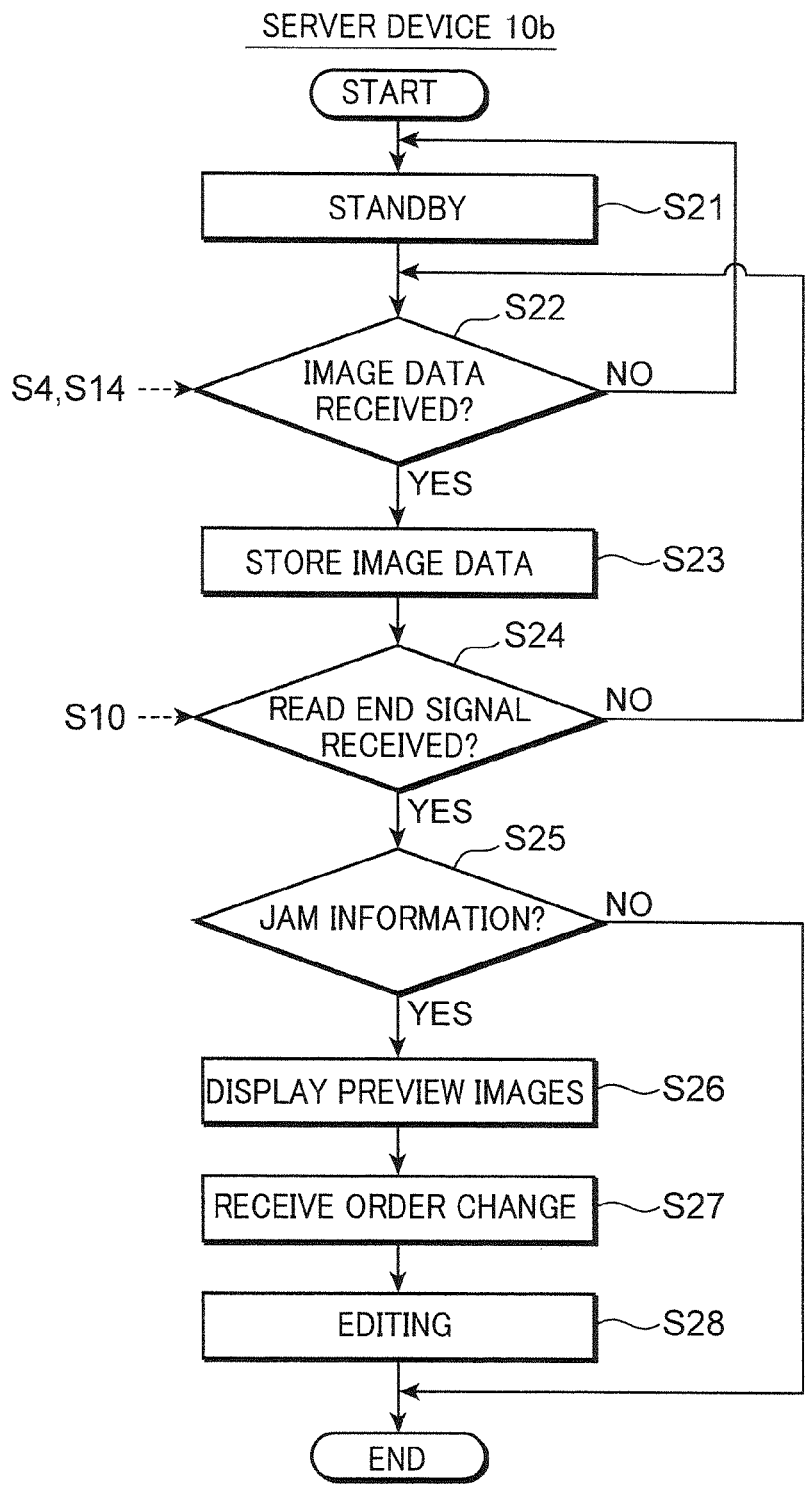
FIG. 11 is a second half of the flow chart.
Figure 13:
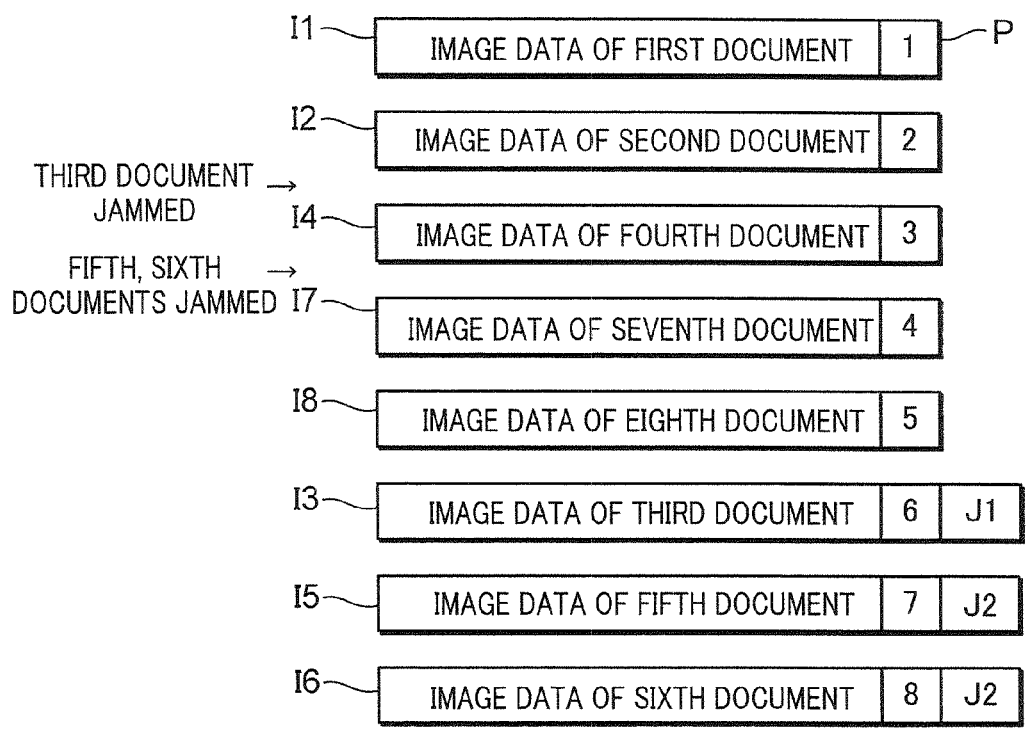
FIG. 13 is a diagram showing a first step of a process of editing the order of pages respectively assigned to a plurality of image data stored in the image data storage in the second embodiment.
Figure 14:
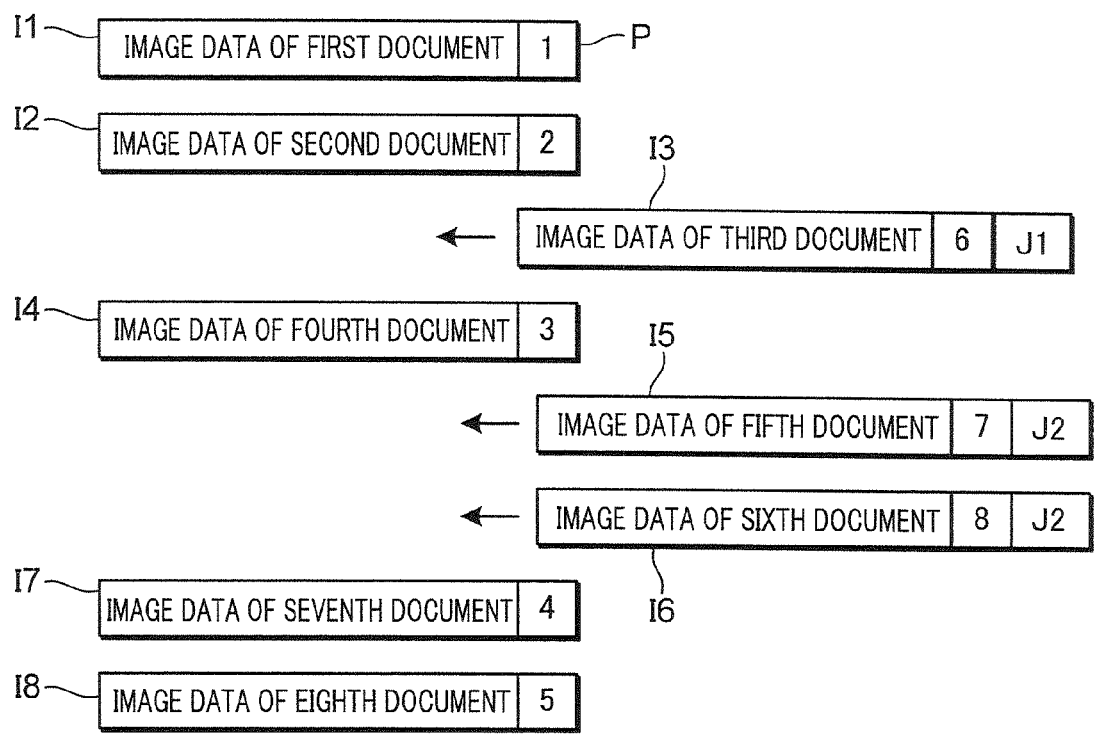
FIG. 14 is a diagram showing a second step of the process.
Figure 15:
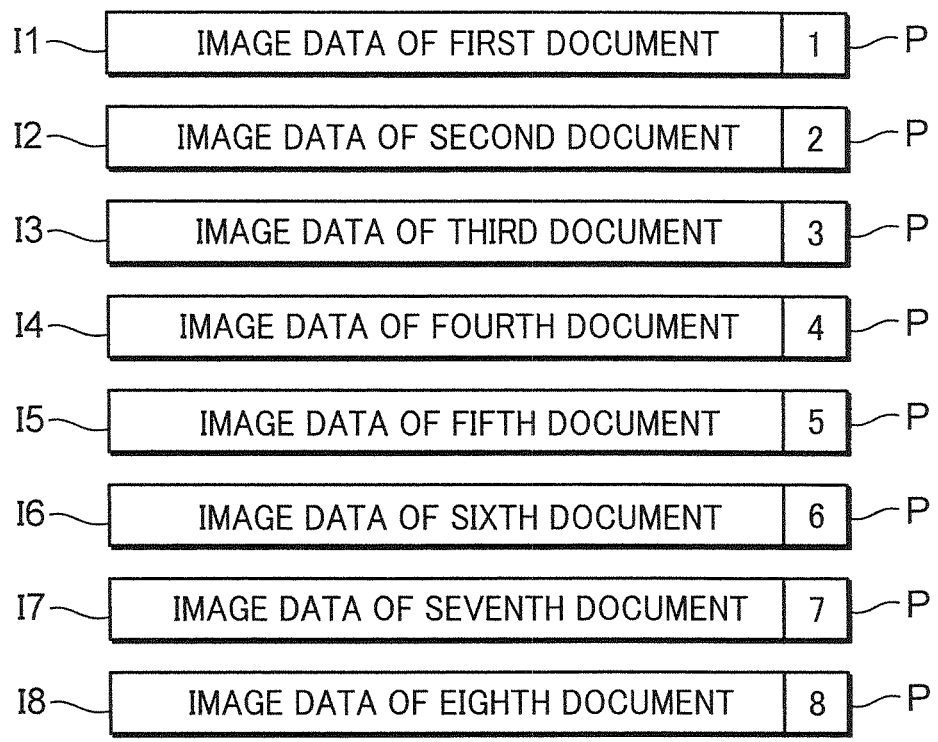
FIG. 15 is a diagram showing a third step of the process.

Next, the operation of the image data storage system according to the second embodiment is described. FIGS. 10 and 11 are a flow chart showing this. FIGS. 13 to 15 are diagrams showing steps of a process of editing the order of pages respectively assigned to a plurality of image data I1 to I8 stored in the image data storage 21b in the second embodiment.

In the second embodiment, a processing of Step S13-1 is added after a processing of Step S13. Specifically, the jam information adder 517b reads jam information from the jam information storage 511 and adds it to image data generated in Step S13 (Step S13-1).

Here, jam information "J1" is added to the image data I3 of the third document and jam information "J2" is added to the image data I5, I6 of the fifth and sixth documents. The transmitter 605 transmits the image data added with the jam information to the server device 10b (Step S14). As shown in FIG. 13, in the image data storage 21b, the image data I1 of the first document is stored as the image data of the first page, the image data I2 of the second document is stored as the image data of the second page, the image data I4 of the fourth document is stored as the image data of the third page, the image data I7 of the seventh document is stored as the image data of the fourth page, the image data I8 of the eighth document is stored as the image data of the fifth page, the image data I3 of the third document is stored as the image data of the sixth page, the image data I5 of the fifth document is stored as the image data of the seventh page, and the image data I6 of the sixth document is stored as the image data of the eighth page.

Further, in the second embodiment, after a processing of Step S24, the storage controller 23b judges whether or not there is any image data added with the jam information in the image data I1 to I8 of the eight pages stored in the image data storage 21b (Step S25). If the storage controller 23b does not judge the presence of the image data added with the jam information in the image data I1 to I8 of the eight pages (NO in Step S25), i.e. if no jam has occurred, a process of storing the image data I1 to I8 of the eight pages generated by reading the eight documents in the image data storage 21b is finished.

If the storage controller 23b judges the presence of the image data added with the jam information in the image data I1 to I8 of the eight pages (YES in Step S25), i.e. if a jam has occurred, a transition is made to a process of manually editing the order of the pages respectively assigned to the image data I1 to I8 of the eight pages.

The storage controller 23b reads the image data I1 to I8 of the eight pages stored in the image data storage 21b (this means the reading of the image data I3, I5 and I6 added with the jam information). The image generator 27 generates preview images of the read image data I1 to I8. The display controller 25b causes the display unit 43 to display the generated preview images (Step S26).

Figure 12:
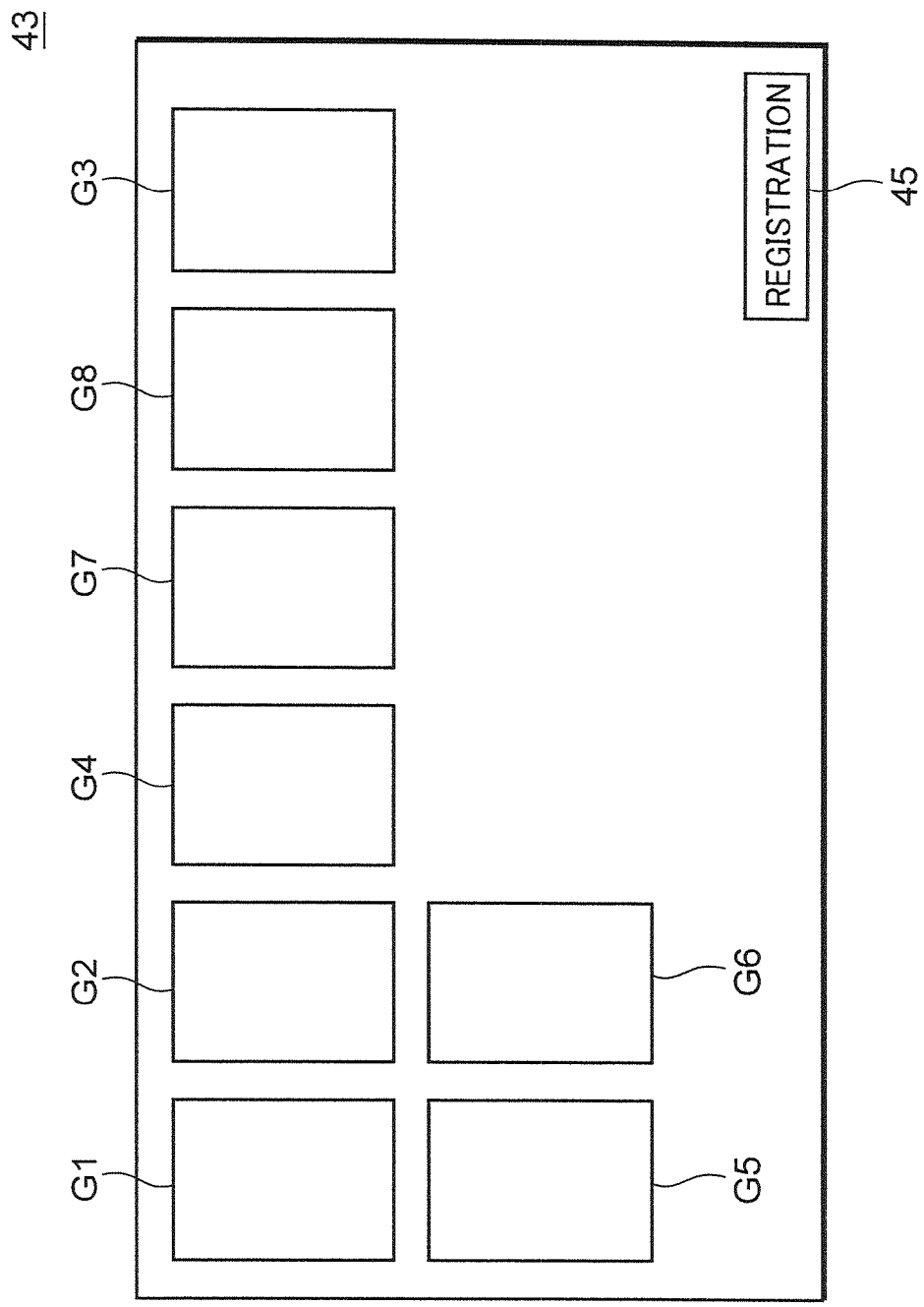
FIG. 12 is a diagram showing an example of a preview image.

In this way, the preview images G1 to G8 are displayed on the display unit 43 as shown in FIG. 12. The preview image G1 of the image data I1 indicates the first document, the preview image G2 of the image data I2 indicates the second document, the preview image G3 of the image data I3 indicates the third document, the preview image G4 of the image data I4 indicates the fourth document, the preview image G5 of the image data I5 indicates the fifth document, the preview image G6 of the image data I6 indicates the sixth document, the preview image G7 of the image data I7 indicates the seventh document and the preview image G8 of the image data I8 indicates the eighth document.

The preview images G1, G2 are images specifying image data of the documents read in the first reading mode by the document reading unit 200 before the jam detector 507 detects the occurrence of the first jam. The preview image G4 is an image specifying the image data of the document read by the document reading unit 200 when a first reading instruction (first one) is received by the first reading receiver 513. The preview images G7, G8 are images specifying the image data of the documents read by the document reading unit 200 when a first reading instruction (second one) is received by the first reading receiver 513.

The preview image G3 is an image specifying the image data of the document read by the document reading unit 200 when a second reading instruction (first one) is received by the second reading receiver 515. The preview images G5, G6 are images specifying the image data of the documents read by the document reading unit 200 when a second reading instruction (second one) is received by the second reading receiver 515.

The user touches the image G3 and drags it to between the images G2 and G4. Subsequently, the user touches the image G5 and drags it to between the images G4 and G7. Finally, the user touches the image G6 and drags it to between the images G5 and G7. Schematization of these operations is FIG. 14.

When the user operates a registration key 45 to confirm an order change, it is received by the change receiver 29 (Step S27). This causes the storage controller 23b to edit the pages respectively assigned to the image data I1 to I8 (Step S28). Specifically, as shown in FIG. 15, the storage controller 23b deletes the jam information from the image data added with the jam information "J1", "J2", changes the page information of the respective image data in the confirmed order and stores the changed page information in the image data storage 21b.

In this way, the order of the images of the eight pages becomes the same as that of the plurality of documents. That is, as shown in FIG. 15, the first document becomes the image of the first page, the second document becomes the image of the second page, the third document becomes the image of the third page, the fourth document becomes the image of the fourth page, the fifth document becomes the image of the fifth page, the sixth document becomes the image of the sixth page, the seventh document becomes the image of the seventh page and the eighth document becomes the image of the eighth page.

The second embodiment has the following effects in addition to the effects of the first embodiment described above.

As described above, according to the image data storage system according to the first embodiment, the reading of the remaining documents after the jammed document is continued in the first reading mode and the jammed documents are read in the second reading mode at the end if a jam occurs in reading a plurality of documents. Thus, the image data are stored in the image data storage 21a (FIG. 3) with the page assigned to the image data of the jammed document put behind the pages assigned to the image data of the documents that are not jammed as shown in FIG. 7 when a jam occurs. Thus, the order of the plurality of documents and that of their images differ.

According to the second embodiment, the preview images of the image data added with the jam information are displayed on the display unit 43 (Step S26), and an operation of changing the order of the pages assigned to the image data is received (Step S27). The order of the pages respectively assigned to the plurality of image data is edited so as to achieve the received order and the image data are stored in the edited order in the image data storage (Step S28).

Accordingly, even if all the jammed documents are read in the second reading mode at the end, the order of the pages assigned to the plurality of image data can be manually edited so that the order of the plurality of documents becomes the same as that of the images thereof.

First and second modifications of the second embodiment are described. In the first modification, the display controller 25b causes the display unit 43 to display images of (a) and images of (b) below in a distinctive manner. The images of (a) mean images (preview images G1, G2) specifying image data of the documents read in the first reading mode by the document reading unit 200 before the jam detector 507 detects the occurrence of a jam and images (preview images G4, G7 and G8) specifying image data of the documents read by the document reading unit 200 when a first reading instruction is received by the first reading receiver 513.

The images of (b) mean images (preview images G3, G5 and G6) specifying image data of the documents read by the document reading unit 200 when a second reading instruction is received by the second reading receiver 515.

For example, a character image "jammed document" is displayed on the display unit 43 together with the images of (b), i.e. the images (preview images G3, G5 and G6) specifying the image data of the documents set on the platen glass 231 (an example of the platen) and read when a jam occurs.

According to the first modification, the user can easily specify which of the preview images G1 to G8 corresponds to the image data of the jammed document.

In the second modification, the preview images G3, G5 and G6 can be specified as the preview images of the image data of the documents set on the platen glass 231 and read due to the occurrence of the jam specified in the chronological order. That is, the jam information adder 517b adds the jam information capable of specifying the jams in the chronological order to the image data of the documents read by the document reading unit 200 when the jam detector 507 detects the occurrence of a plurality of jams. For example, jam information of the first jam is character data indicating "J1" and that of the second jam is character data indicating "J2".

The display controller 25b specifies to which jam in the chronological order each of the images of (b) corresponds and causes the display unit 403 to display the correspondence. For example, a character image "first jam" is displayed on the display unit 43 together with the preview image G3, and a character image "second jam" is displayed on the display unit 43 together with the preview images G5, G6.

According to the second modification, when a plurality of jams occur, the order of pages assigned to a plurality of image data can be easily edited.

The image data storage system has been described in the second embodiment. An embodiment in which the server device 10b is incorporated into the image forming apparatus 1b also has the above main effects of the second embodiment. In this embodiment, in the scanner mode, a mode controller 501 shown in FIG. 8 controls the document reading unit 200, the document feeding unit 300 and the server device 10b and stores image data of a plurality of documents read by the document reading unit 200 in the server device 10b.

Third Embodiment

An image data storage system according to a third embodiment is described mainly on points of difference from the image data storage systems according to the first and second embodiments, but not on the same points. As shown in FIGS. 13 to 15, in the second embodiment, the order of pages respectively assigned to a plurality of image data can be manually edited so that the order of images of a plurality of pages becomes the same as that of a plurality of documents. Contrary to this, in the third embodiment, the order of pages respectively assigned to a plurality of image data can be automatically edited so that the order of images of a plurality of pages becomes the same as that of a plurality of documents.

Figure 16:
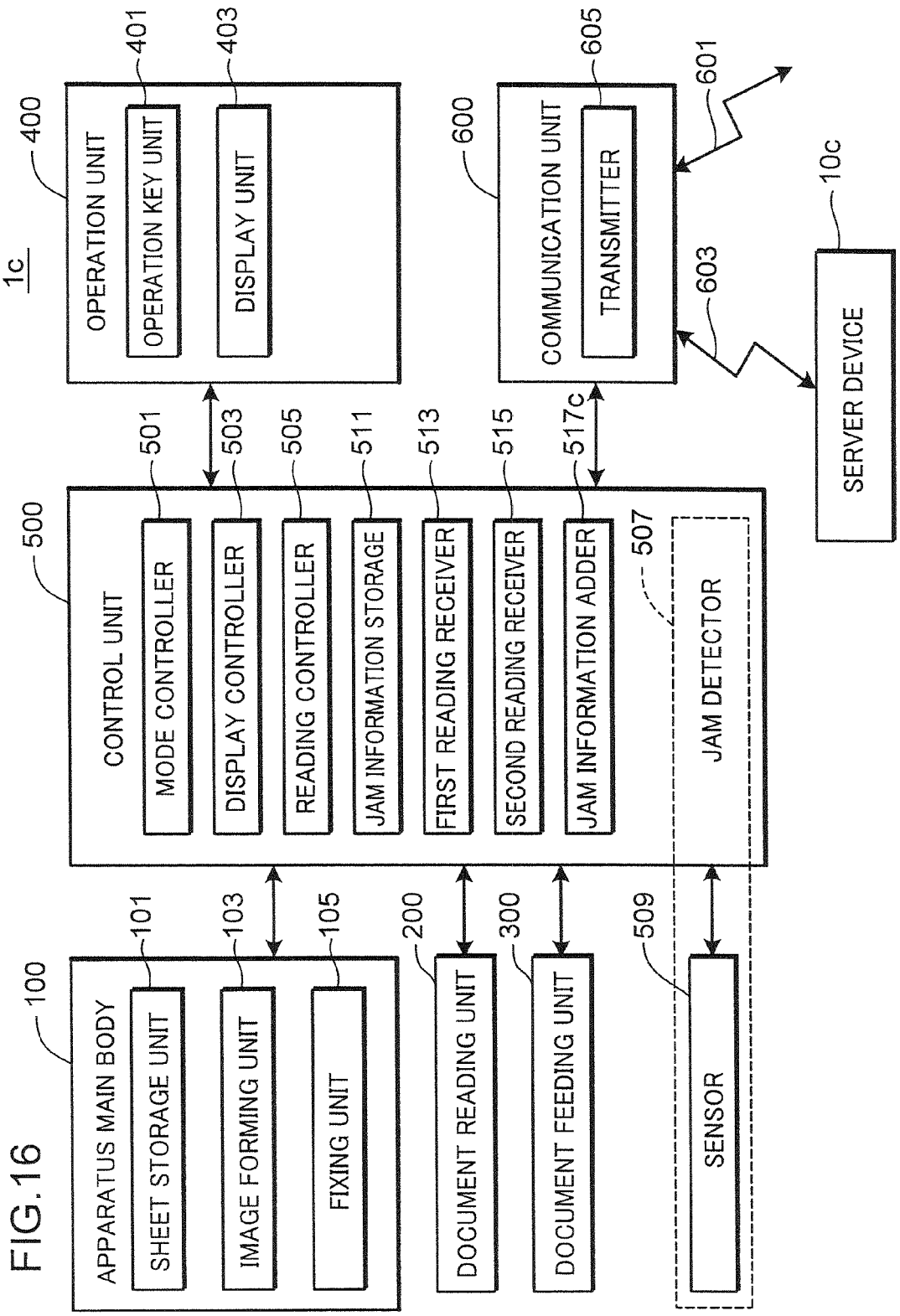
FIG. 16 is a block diagram showing the configuration of an image forming apparatus according to the third embodiment.
Figure 17:
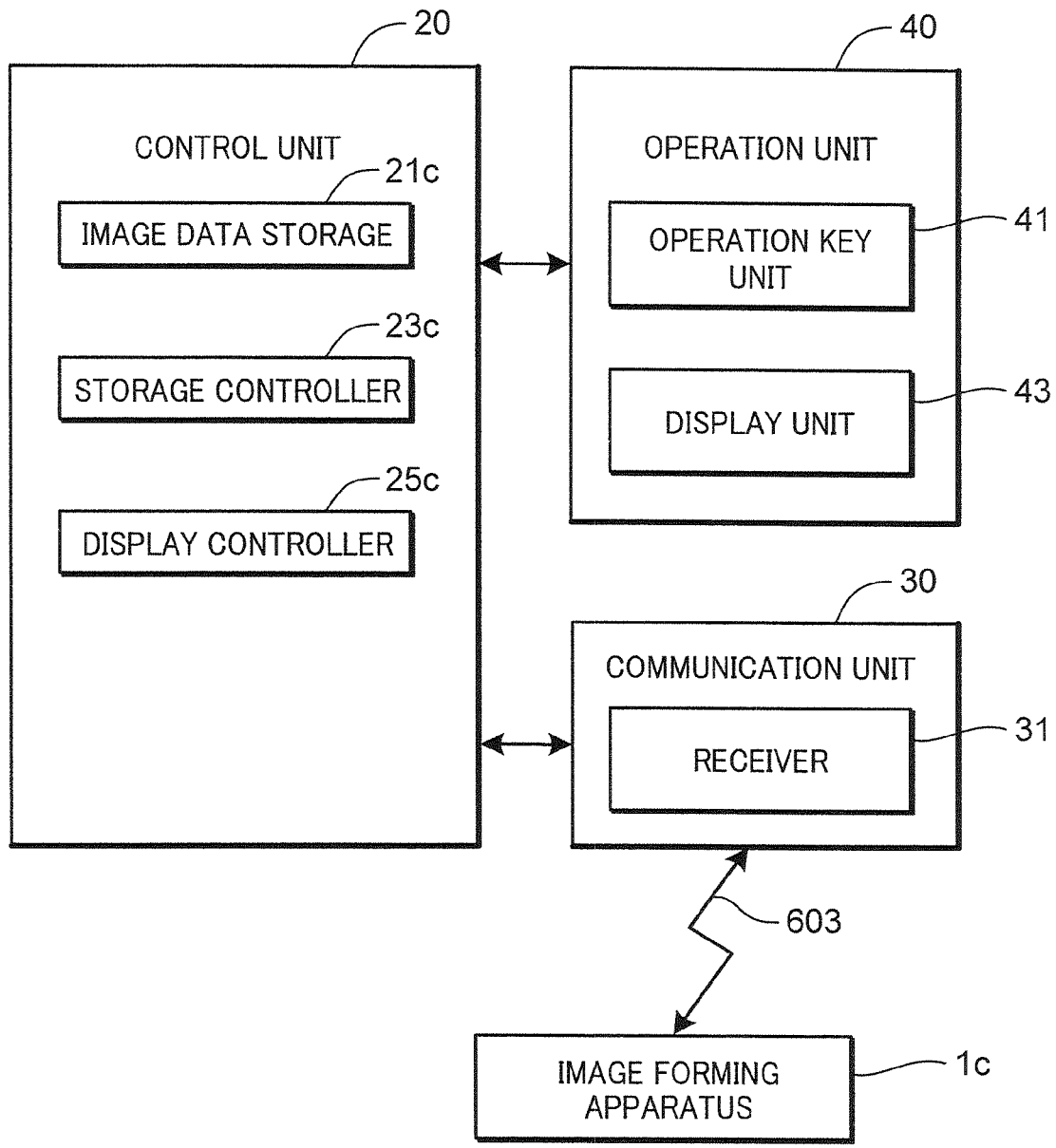
FIG. 17 is a block diagram showing the configuration of a server device according to the third embodiment.

The image data storage system according to the third embodiment includes the image forming apparatus 1c and a server device 10c connected to the image forming apparatus 1c by a LAN. FIG. 16 is a block diagram showing the configuration of the image forming apparatus 1c. FIG. 17 is a block diagram showing the configuration of the server device 10c (an example of the image data storage device). First, the configuration of the image forming apparatus 1c shown in FIG. 16 is described.

The image forming apparatus 1c has the configuration of the image forming apparatus 1a shown in FIG. 2 added with a jam information adder 517c. A control unit 500 has the function of the jam information adder 517c. The jam information adder 517c adds jam information relating first and second image data to each of the first and second image data. The first image data is image data of a document first read by a document reading unit 200 when a first reading instruction is received by a first reading receiver 513. The second image data is image data of a document read by the document reading unit 200 when a second reading instruction is received by a second reading receiver 515.

As shown in FIG. 17, a control unit 20 of the server device 10c has the functions of an image data storage 21c, a storage controller 23c and a display controller 25c. These functions are realized by a CPU, a ROM, a RAM and the like provided in the control unit 20.

The function of the image data storage 21c is similar to that of the image data storage 21a. The function of the display controller 25c is similar to that of the display controller 25a.

The storage controller 23c has a function of editing the order of pages respectively assigned to a plurality of image data including image data added with jam information so that the order of the page assigned to the second image data is one before the order of the page assigned to the first image data and storing the image data in the edited order in the image data storage 21c in addition to the function of the storage controller 23a.

Figure 18:
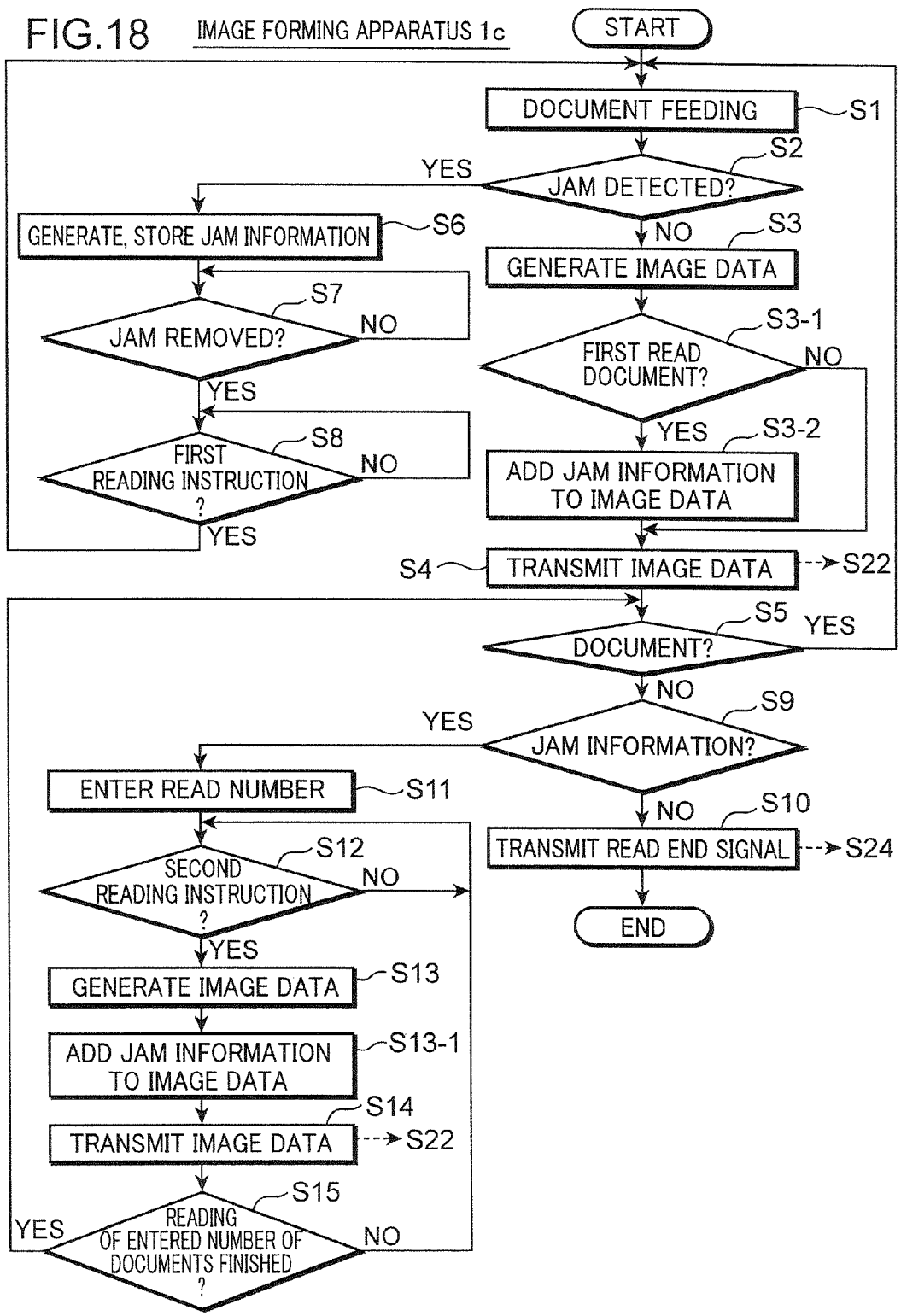
FIG. 18 is a first half of a flow chart showing the operation of an image data storage system according to the third embodiment.
Figure 19:
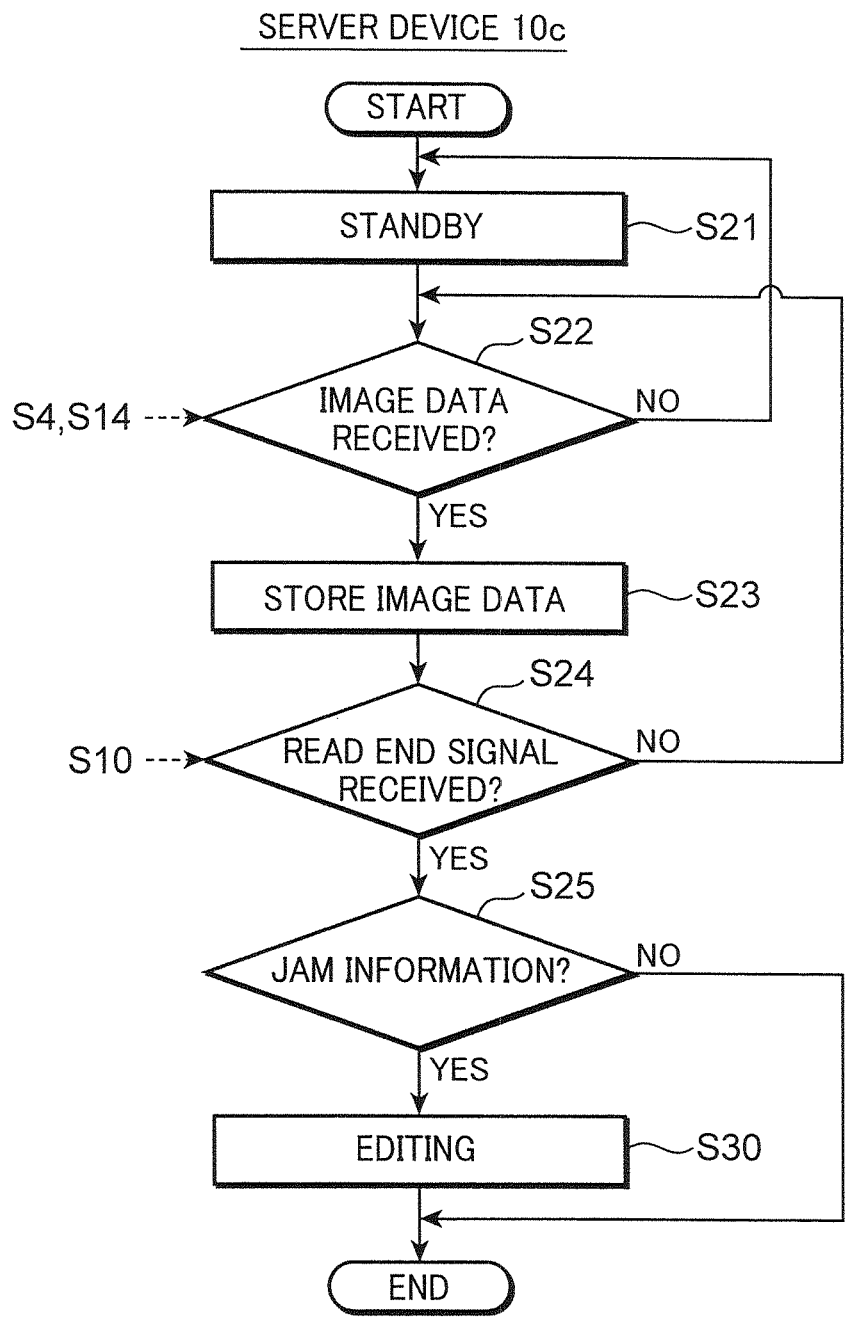
FIG. 19 is a second half of the flow chart.

Next, the operation of the image data storage system according to the third embodiment is described. FIGS. 18 and 19 are a flow chart showing this. FIGS. 20 to 23 are diagrams showing a process of editing the order of pages respectively assigned to a plurality of image data I1 to I8 stored in the image data storage 21c in the third embodiment. In the third embodiment, processings of Steps S3-1 and S3-2 are added after a processing of Step S3. Specifically, a reading controller 505 judges whether or not image data generated in Step S3 is image data (first image data) of a document first read by the document reading unit 200 (Step S3-1) when a first reading instruction is received by the first reading receiver 513 (YES in Step S8). In other words, it is judged whether or not this image data corresponds to the document first read in the first reading mode after the latest first reading instruction is received. In the third embodiment, image data I4 of the fourth document and image data I7 of the seventh document fall under the first image data.

Step S4 follows if the reading controller 505 does not judge that the image data generated in Step S3 is the first image data (NO in Step S3-1).

If the reading controller 505 judges that the image data generated in Step S3 is the first image data (YES in Step S3-1), the jam information adder 517c adds jam information to the first image (Step S3-2). Jam information "J1" is added to the image data I4 of the fourth document, and jam information "J2" is added to the image data I7 of the seventh document. A transmitter 605 transmits the image data added with the jam information to the server device 10c (Step S4).

Further, in the third embodiment, a processing of Step S13-1 is added after a processing of Step S13. This processing is not described here since being already described in the second embodiment.

Furthermore, in the third embodiment, after a processing of Step S24, the storage controller 23c judges whether or not there is any image data added with the jam information in the image data of the eight pages stored in the image data storage 21c as in the second embodiment (Step S25). If the storage controller 23c does not judge the presence of the image data added with the jam information in the image data of the eight pages (NO in Step S25), i.e. if no jam has occurred, a process of storing the image data of the eight pages generated by reading the eight documents in the image data storage 21c is finished.

If the storage controller 23c judges the presence of the image data added with the jam information in the image data of the eight pages (YES in Step S25), i.e. if a jam has occurred, the storage controller 23c edits the order of the image data of the eight pages (Step S30). This is described.

Figure 20:
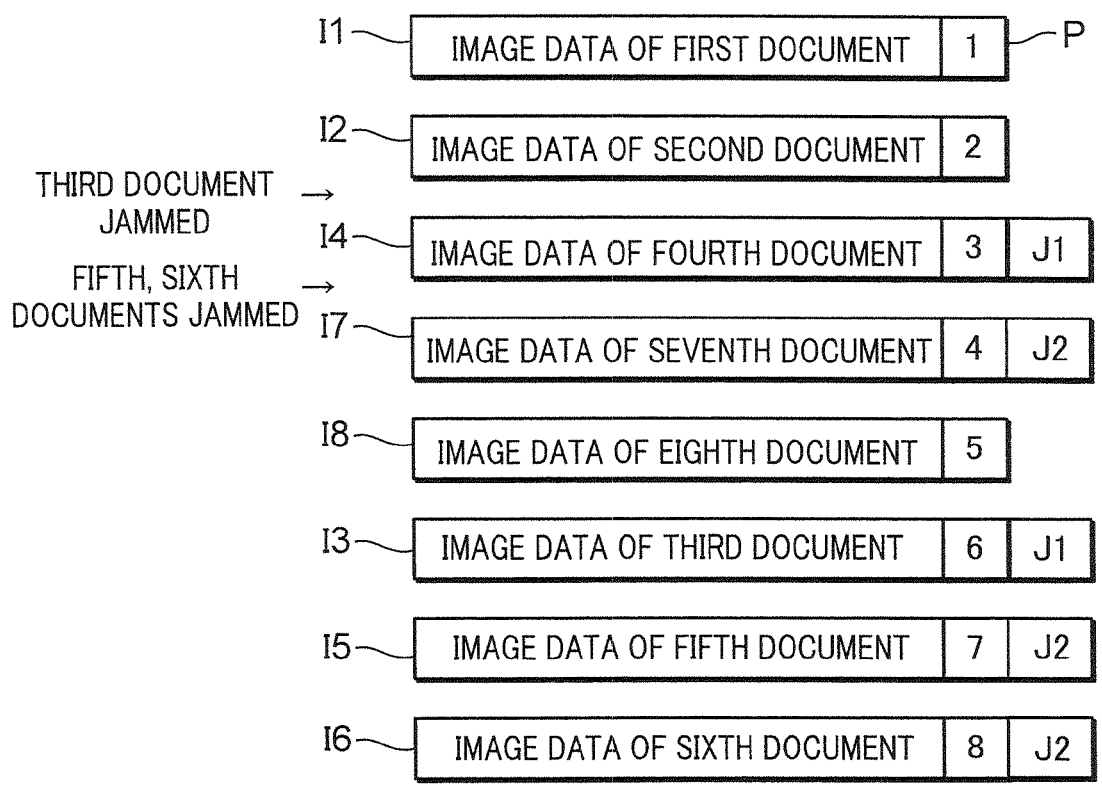
FIG. 20 is a diagram showing a first step of a process of editing the order of pages respectively assigned to a plurality of image data stored in the image data storage in the third embodiment.

As shown in FIG. 20, the image data I1 to I8 of the eight pages before the editing are stored in the image data storage 21c.

The image data I3 of the third document is image data of the document that was not read by the document reading unit 200 due to the occurrence of the first jam. The image data I5, I6 of the fifth and sixth documents are image data of the documents that were not read by the document reading unit 200 due to the occurrence of the second jam. Any of the image data is image data (second image data) of the document read by the document reading unit 200 when the second reading instruction is received by the second reading receiver 515.

The image data I4 of the fourth document is image data of the document first read by the document reading unit 200 after the occurrence of the first jam. The image data I7 of the seventh document is image data of the document first read by the document reading unit 200 after the occurrence of the second jam. Any of the image data is image data (first image data) of the document first read by the document reading unit 200 when the first reading instruction is received by the first reading receiver 513.

The jam information "J1" is added to the image data I3 of the third document and the image data I4 of the fourth document. The jam information "J2" is added to the image data I5 of the fifth document, the image data I6 of the sixth document and the image data I7 of the seventh document. The jam information "J1" relates the image data I3 of the third document and the image data I4 of the fourth document. The jam information "J2" relates the image data I5, I6 of the fifth and sixth documents and the image data I7 of the seventh document.

Figure 21:
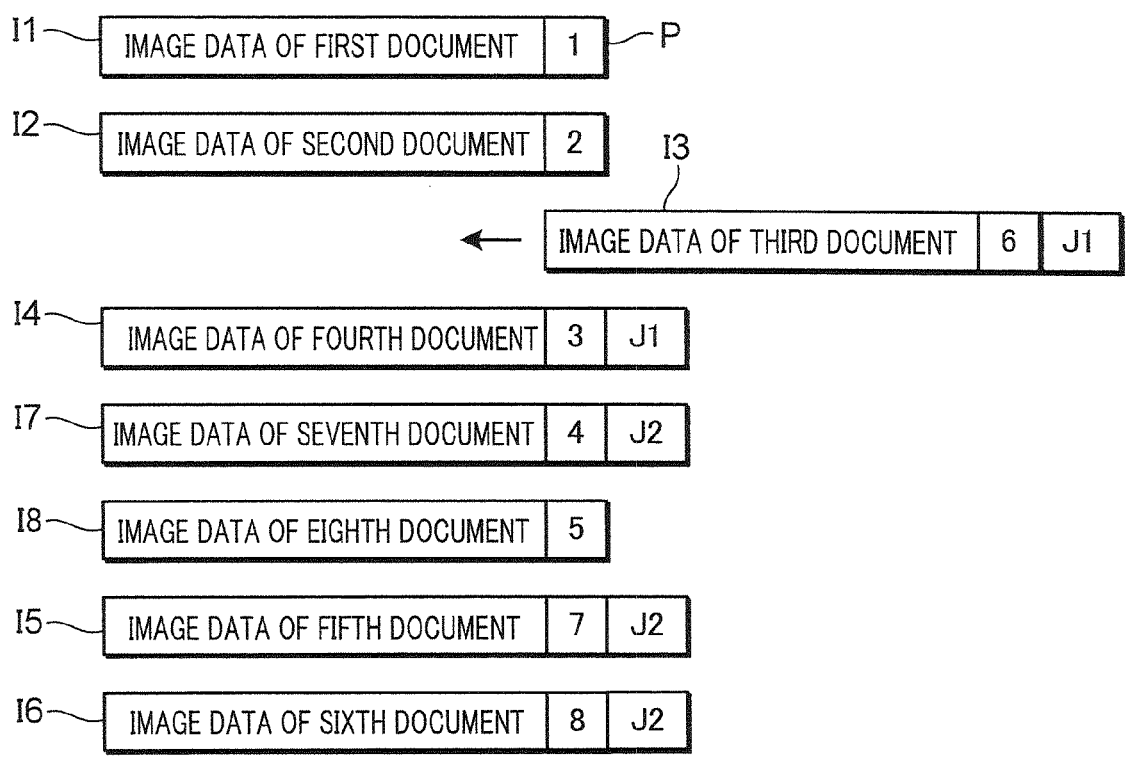
FIG. 21 is a diagram showing a second step of the process.

Since the jam information "J1" is added to the image data I3 of the third document, the image data I3 of the third document is put one before the image data I4 of the fourth document that is the image data added with the jam information "J1" as shown in FIG. 21.

Figure 22:
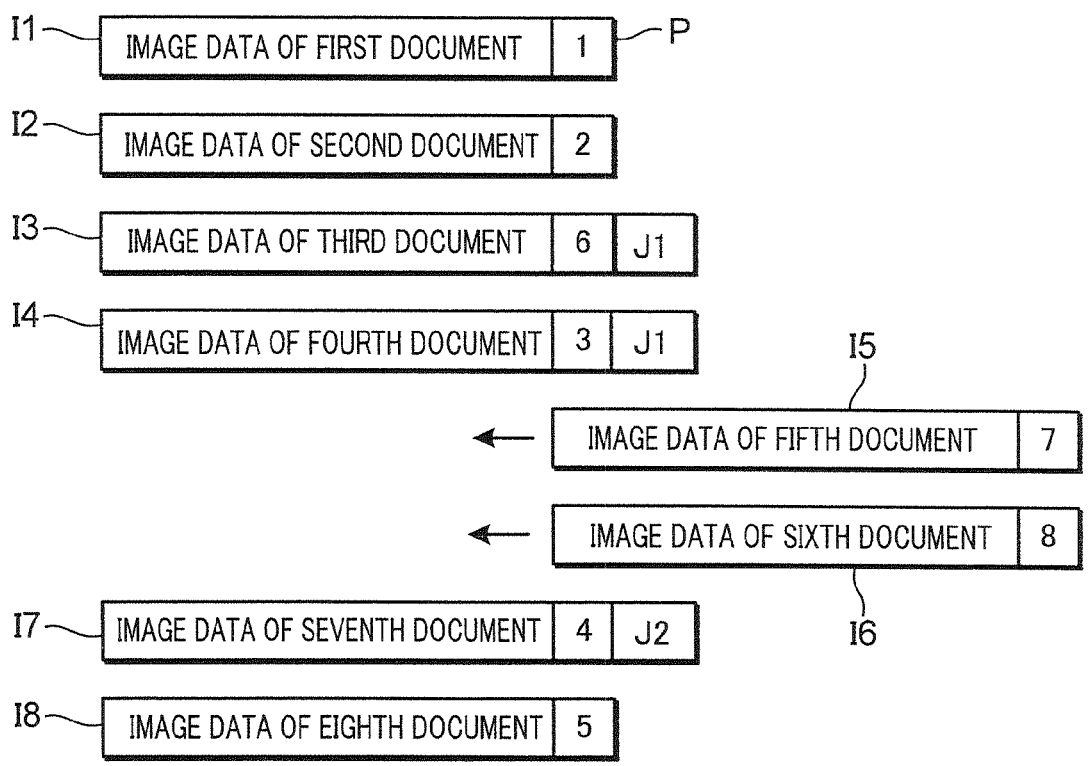
FIG. 22 is a diagram showing a third step of the process.

Since the jam information "J2" is added to the image data I5, I6 of the fifth and sixth documents, the image data I5, I6 of the fifth and sixth documents are put one before the image data I7 of the seventh document that is the image data added with the jam information "J2" as shown in FIG. 22.

Figure 23:
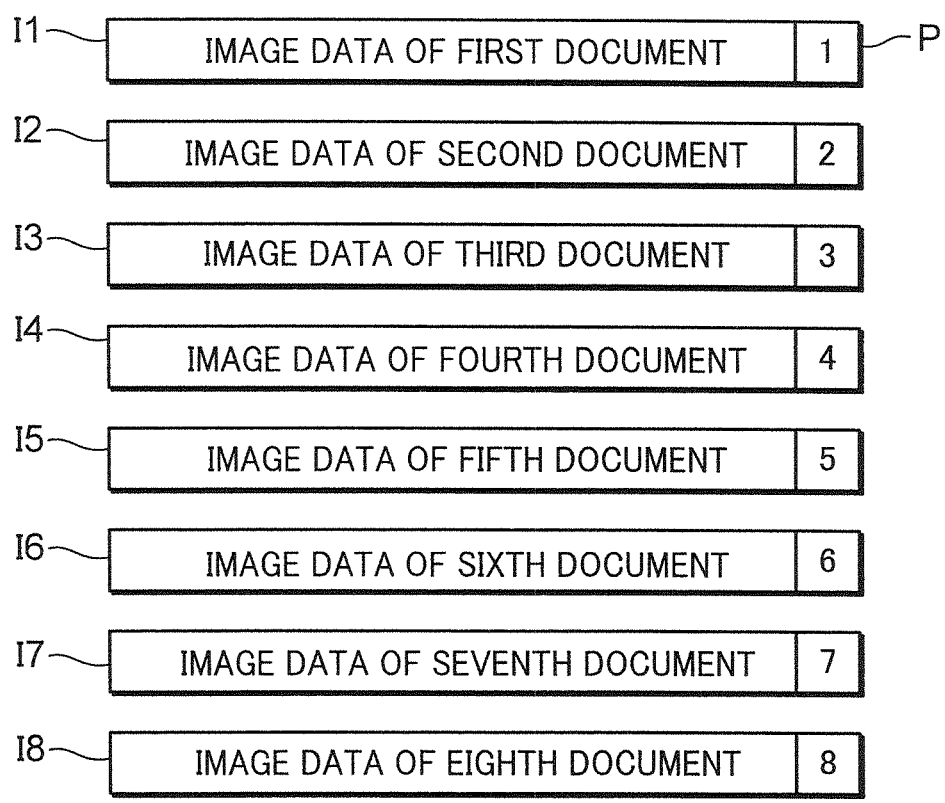
FIG. 23 is a diagram showing a fourth step of the process.

Finally, as shown in FIG. 23, the jam information is deleted from the image data added with the jam information "J1", "J2", the page information P is changed to the order after the rearrangement of the image data I1 to I8 of the eight pages, and the image data are stored in the changed order in the image data storage 21c.

In this way, the order of the images of the eight pages becomes the same as the order of the plurality of documents. That is, as shown in FIG. 23, the first document becomes the image of the first page, the second document becomes the image of the second page, the third document becomes the image of the third page, the fourth document becomes the image of the fourth page, the fifth document becomes the image of the fifth page, the sixth document becomes the image of the sixth page, the seventh document becomes the image of the seventh page and the eighth document becomes the image of the eighth page.

The third embodiment has the following effects in addition to the effects of the first embodiment described above. According to the third embodiment, the jam information relating the both image data is added to the image data (i.e. first image data) of the document first read in the first reading mode after the occurrence of the jam and the image data (i.e. second image data) of the document read in the second reading mode at the end after the occurrence of the jam (Step S3-2, Step S13-1). As shown in FIGS. 20 to 23, the order of the pages assigned to the plurality of image data is edited so that the order of the page assigned to the second image data comes one before the order of the page assigned to the first image data, and the image data are stored in the edited order in the image data storage (Step S30).

Accordingly, even if all the jammed documents are read in the second reading mode at the end, the order of the pages assigned to the plurality of image data can be automatically edited so that the order of the plurality of documents becomes the same as that of the images of these documents.

The image data storage system has been described in the third embodiment. An embodiment in which the server device 10c is incorporated into the image forming apparatus 1c also has the above main effects of the third embodiment. In this embodiment, in the scanner mode, a mode controller 501 shown in FIG. 16 controls the document reading unit 200, the document feeding unit 300 and the server device 10c and stores image data of a plurality of documents read by the document reading unit 200 in the server device 10c.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image data storage system, comprising a document reading apparatus, and an image data storage device,
the document reading apparatus including:
an auto document feeder unit, a platen, a document reading unit, a reading controller for causing the document reading unit to perform a first reading mode for generating image data by reading a document fed by the auto document feeder unit and a second reading mode for generating image data by reading a document set on the platen, a transmitter for transmitting image data generated by the document reading unit to the image data storage device, a jam detector for detecting whether or not a jam has occurred in the auto document feeder unit while a plurality of documents set in the auto document feeder unit are fed to the document reading unit by the auto document feeder unit, a first reading receiver for receiving a first reading instruction to cause the document reading unit to continue reading the plurality of documents in the first reading mode when a jam is detected by the jam detector, and a second reading receiver for receiving a second reading instruction to cause the document reading unit to continue reading the plurality of documents in the second reading mode after the reading of the plurality of documents is continued in the first reading mode by the document reading unit;

the reading controller causes the document reading unit to continue reading the plurality of documents in the first reading mode when the first reading instruction is received by the first reading receiver and causes the document reading unit to continue reading the plurality of documents in the second reading mode when the second reading instruction is received by the second reading receiver; and the image data storage device includes:
- a receiver for receiving image data transmitted from the transmitter, and
- an image data storage for storing a plurality of image data generated by reading the plurality of documents by the document reading unit and received by the receiver, wherein:

the document reading apparatus includes a jam information adder for adding jam information to image data of a document read by the document reading unit when the second reading instruction is received by the second reading receiver;

the transmitter transmits the image data added with the jam information to the image data storage device; and the image data storage device further includes:
- a display unit,
- a display controller for causing the display unit to display an image specifying the image data added with the jam information,
- a change receiver for receiving an operation of changing the order of a page assigned to the image data added with the jam information in a state where the images are displayed on the display unit, and
- a storage controller for editing the order of pages respectively assigned to the plurality of image data including the image data added with the jam information to achieve the order received by the change receiver and storing the image data in the edited order in the image data storage.

2. An image data storage system, comprising a document reading apparatus, and an image data storage device, the document reading apparatus including:

an auto document feeder unit, a platen, a document reading unit, a reading controller for causing the document reading unit to perform a first reading mode for generating image data by reading a document fed by the auto document feeder unit and a second reading mode for generating image data by reading a document set on the platen, a transmitter for transmitting image data generated by the document reading unit to the image data storage device, a jam detector for detecting whether or not a jam has occurred in the auto document feeder unit while a plurality of documents set in the auto document feeder unit are fed to the document reading unit by the auto document feeder unit, a first reading receiver for receiving a first reading instruction to cause the document reading unit to continue reading the plurality of documents in the first reading mode when a jam is detected by the jam detector, and a second reading receiver for receiving a second reading instruction to cause the document reading unit to continue reading the plurality of documents in the second reading mode after the reading of the plurality of documents is continued in the first reading mode by the document reading unit;

the reading controller causes the document reading unit to continue reading the plurality of documents in the first reading mode when the first reading instruction is received by the first reading receiver and causes the document reading unit to continue reading the plurality of documents in the second reading mode when the second reading instruction is received by the second reading receiver; and the image data storage device includes:
- a receiver for receiving image data transmitted from the transmitter, and
- an image data storage for storing a plurality of image data generated by reading the plurality of documents by the document reading unit and received by the receiver, wherein:

the document reading apparatus includes a jam information adder for adding jam information to image data of a document read by the document reading unit when the second reading instruction is received by the second reading receiver;

the transmitter transmits the image data added with the jam information to the image data storage device; and the image data storage device further includes:
- a display unit,
- a display controller for causing the display unit to display (a) images specifying the image data of the documents read in the first reading mode by the document reading unit before the jam detector detects the occurrence of the first jam and images specifying the image data of the documents read by the document reading unit when the first reading instruction is received by the first reading receiver and (b) images specifying the image data of the documents read by the document reading unit when the second reading instruction is received by the second reading receiver;
- a change receiver for receiving an operation of changing the orders of pages assigned to the image data of the documents specified by the images of (b) in a state where the images of (a) and the images of (b) are displayed on the display unit; and a storage controller for editing the order of pages respectively assigned to the image data of the documents specified by the images of (a) and the images of (b) to achieve the order received by the change receiver and storing the image data in the edited order in the image data section.

3. An image data storage system according to claim 2, wherein the display controller causes the display unit to display the images of (a) and the images of (b) in a distinctive manner.

4. An image data storage system according to claim 3, wherein:

the jam information adder adds the jam information capable of specifying the jam in the chronological order to the image data of the document read by the document reading unit when the jam detector detects the occurrence of a plurality of jams; and the display controller specifies to which jam each of the images of (b) corresponds and causes the display unit to display the specified correspondence.

5. An image data storage system, comprising a document reading apparatus, and an image data storage device, the document reading apparatus including:

an auto document feeder unit, a platen, a document reading unit, a reading controller for causing the document reading unit to perform a first reading mode for generating image data by reading a document fed by the auto document feeder unit and a second reading mode for generating image data by reading a document set on the platen, a transmitter for transmitting image data generated by the document reading unit to the image data storage device, a jam detector for detecting whether or not a jam has occurred in the auto document feeder unit while a plurality of documents set in the auto document feeder unit are fed to the document reading unit by the auto document feeder unit, a first reading receiver for receiving a first reading instruction to cause the document reading unit to continue reading the plurality of documents in the first reading mode when a jam is detected by the jam detector, and a second reading receiver for receiving a second reading instruction to cause the document reading unit to continue reading the plurality of documents in the second reading mode after the reading of the plurality of documents is continued in the first reading mode by the document reading unit;

the reading controller causes the document reading unit to continue reading the plurality of documents in the first reading mode when the first reading instruction is received by the first reading receiver and causes the document reading unit to continue reading the plurality of documents in the second reading mode when the second reading instruction is received by the second reading receiver; and the image data storage device includes:

a receiver for receiving image data transmitted from the transmitter, and an image data storage for storing a plurality of image data generated by reading the plurality of documents by the document reading unit and received by the receiver, wherein:

the document reading apparatus further includes a jam information adder for adding jam information relating first and second image data to each of the first image data that is image data of the document first read by the document reading unit when the first reading instruction is received by the first reading receiver and the second image data that is image data of the document read by the document reading unit when the second reading instruction is received by the second reading receiver; and the image data storage device further includes a storage controller for editing the order of pages respectively assigned to the plurality of image data including the image data added with the jam information so that the order of the page assigned to the second image data comes one before that of the page assigned to the first image data and storing the image data in the edited order in the image data section.

* * * * *